US009912862B2

(12) United States Patent
Peruch et al.

(10) Patent No.: US 9,912,862 B2
(45) Date of Patent: Mar. 6, 2018

(54) SYSTEM AND METHOD FOR ASSISTED 3D SCANNING

(71) Applicant: AQUIFI, INC., Palo Alto, CA (US)

(72) Inventors: Francesco Peruch, Sunnyvale, CA (US); Giridhar Murali, Sunnyvale, CA (US); Giulio Marin, Sunnyvale, CA (US); Abbas Rafii, Palo Alto, CA (US); Kinh Tieu, Sunnyvale, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days.

(21) Appl. No.: 15/445,735

(22) Filed: Feb. 28, 2017

(65) Prior Publication Data

US 2017/0251143 A1     Aug. 31, 2017

Related U.S. Application Data

(60) Provisional application No. 62/301,603, filed on Feb. 29, 2016.

(51) Int. Cl.
| | |
|---|---|
| *H04N 5/232* | (2006.01) |
| *G06T 17/00* | (2006.01) |
| *H04N 9/04* | (2006.01) |
| *H04N 13/00* | (2018.01) |
| *H04N 13/02* | (2006.01) |

(52) U.S. Cl.
CPC ......... *H04N 5/23222* (2013.01); *G06T 17/00* (2013.01); *H04N 5/23293* (2013.01); *H04N 9/04* (2013.01); *H04N 13/0055* (2013.01); *H04N 13/0239* (2013.01);
(Continued)

(58) Field of Classification Search
CPC ..... G06T 19/20; G06T 19/2004; G06T 11/60; G06T 7/0012; G06T 7/60; G06T 17/00; H04N 5/378; H04N 2013/0081; H04N 13/02; H04N 13/0271; H04N 13/0022
See application file for complete search history.

(56) References Cited

U.S. PATENT DOCUMENTS 8,705,893 B1 * 4/2014 Zhang ................ G06K 9/00201
                                                345/418
9,102,055 B1    8/2015 Konolige et al.
(Continued)

OTHER PUBLICATIONS

International Search Report and Written Opinion for corresponding Application No. PCT/US2017/020028, dated May 15, 2017 (10 pages).

*Primary Examiner* — Behrooz Senfi
(74) *Attorney, Agent, or Firm* — Lewis Roca Rothgerber Christie LLP

(57) ABSTRACT

A three-dimensional scanning system includes: a camera configured to capture images; a processor; and memory coupled to the camera and the processor, the memory being configured to store: the images captured by the camera; and instructions that, when executed by the processor, cause the processor to: control the camera to capture one or more initial images of a subject from a first pose of the camera; compute a guidance map in accordance with the one or more initial images to identify one or more next poses; control the camera to capture one or more additional images from at least one of the one or more next poses; update the guidance map in accordance with the one or more additional images; and output the images captured by the camera to generate a three-dimensional model.

19 Claims, 19 Drawing Sheets

(52) U.S. Cl.
CPC ..... *H04N 13/0257* (2013.01); *H04N 13/0296* (2013.01); *H04N 2013/0077* (2013.01)

(56) References Cited

U.S. PATENT DOCUMENTS

| | | |
|---|---|---|
| 2011/0134225 A1 | 6/2011 | Saint-Pierre et al. |
| 2011/0255775 A1 | 10/2011 | McNamer et al. |
| 2012/0056982 A1 | 3/2012 | Katz et al. |
| 2012/0271173 A1 | 10/2012 | Li |
| 2014/0132729 A1 | 5/2014 | Foulk et al. |
| 2015/0279118 A1* | 10/2015 | Dou ................. G06T 15/04 345/427 |
| 2017/0085733 A1* | 3/2017 | Ilic ................... G06T 19/20 |

* cited by examiner

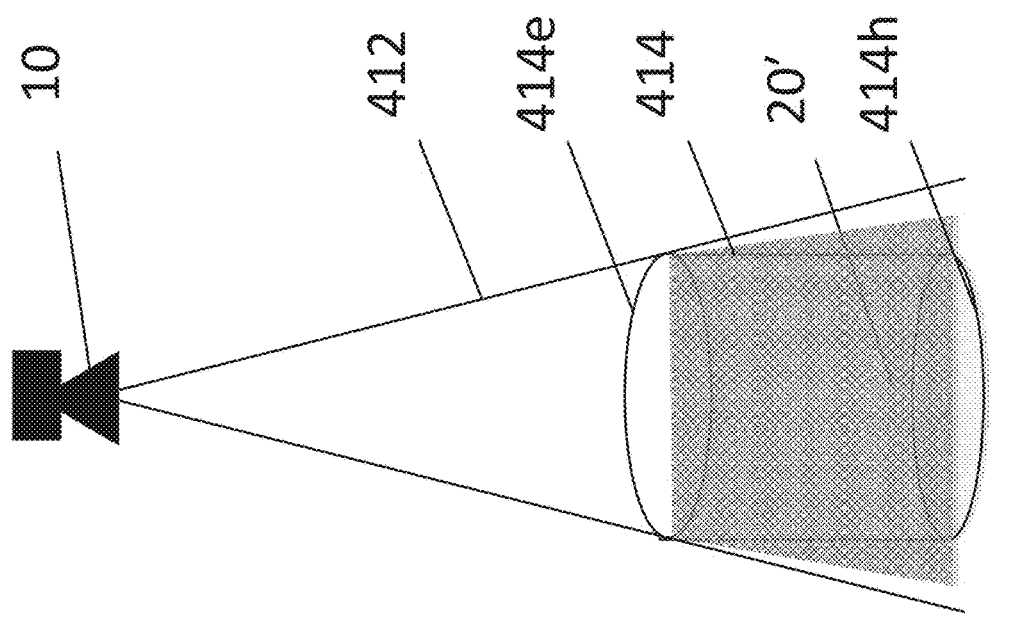

1

SYSTEM AND METHOD FOR ASSISTED 3D SCANNING

CROSS-REFERENCE TO RELATED APPLICATION(S)

This application claims the benefit of U.S. Provisional Patent Application No. 62/301,603, filed in the United States Patent and Trademark Office on Feb. 29, 2016, the entire disclosure of which is incorporated by reference herein.

FIELD

Aspects of embodiments of the present invention relate to the fields image capture systems, image processing, and three-dimensional (3D) scanning.

BACKGROUND

Aspects of embodiments of the present invention relate to the field of three-dimensional (3D) scanning. In this process, a camera collects data from different views of an ordinary object, then aligns and combines the data to create a 3D model of the shape and color (if available) of the object. The term 'mapping' is also sometimes used to reflect the process of capturing a space or, more generally, a scene in 3D.

Generating 3D models in this way presents the particular challenge that substantially all of the sides of the object or portion of the scene need to be imaged in order to produce a complete model of the object. For example, it may be difficult or impossible to produce an accurate model of portions of a subject (e.g., an object or a scene) that are not captured during the 3D scanning process. In addition, failing to capture images of the object from some certain angles may result in holes, gaps, distortions, or other artifacts in the generated model (in some instances, the bottom surface of the object may be ignored if it is not relevant to the desired 3D model).

To cover sufficient color and geometric aspects of an object, the scanning process may capture hundreds of frames of the relevant portion of the scene. The amount of data that is produced and the processing time of the data can be very high. For instance, if an RGB-D camera produces 614 KB (~VGA) data per frame, while the associated color camera produces 2764 KB (~720 p) data per frame, at 15 frames per second and 30 seconds of scanning time, the amount of raw image data that is produced can be as high 1.42 GB. The processing time for building a 3D model also proportionally increases as a function of the amount of data that is produced. Furthermore, the user operating the camera may not completely capture the relevant aspects of the object, or over-capture (over sample) one side and under-capture (under sample) another view. The under-sampling may not produce the desired resolution or totally miss some sides of the object that may have a complex 3D shape, whereas over-sampling can produce redundant data (e.g. additional data that has low information content for the purpose of constructing the 3D model) that unnecessarily consumes the communication and computing resources of the scanning system.

SUMMARY

Aspects of embodiments of the present invention are directed to systems and methods for assisted or guided scanning of objects and scenes. The assistance or guidance may be used to improve the accuracy of 3D models generated through the scanning process, by guiding a scanning device to poses (e.g., position and orientation of the scanning device) that improve coverage of relevant aspects of the target commensurate with the usage goal of the model, and that reduce over-capture.

According to one embodiment of the present invention, a three-dimensional scanning system includes: a camera configured to capture images; a processor; and memory coupled to the camera and the processor, the memory being configured to store: the images captured by the camera; and instructions that, when executed by the processor, cause the processor to: control the camera to capture one or more initial images of a subject from a first pose of the camera; compute a guidance map in accordance with the one or more initial images to identify one or more next poses; control the camera to capture one or more additional images from at least one of the one or more next poses; update the guidance map in accordance with the one or more additional images; and output the images captured by the camera to generate a three-dimensional model.

The camera may be a depth camera.

The depth camera may be a stereoscopic depth camera including: a first camera having a first field of view with a first optical axis; and a second camera spaced apart from the first camera and having a second field of view overlapping the first field of view and having a second optical axis substantially parallel to the first optical axis.

The three-dimensional scanning system may further include a color camera registered with the depth camera.

The three-dimensional scanning system may further include a display coupled to the processor, wherein the memory further stores instructions that cause the processor to control the display to provide feedback to a user of the three-dimensional scanning system, the feedback including a graphical representation of the one or more next poses of the guidance map.

The graphical representation may be a dome around the subject, and a heat map indicates which portions of the dome correspond to the one or more next poses.

The one or more next poses may form a path.

The path may be selected in accordance with increasing coverage of the subject and reducing scanning time.

The guidance map may be a coverage map.

The subject may be a container, the memory may further store instructions that cause the processor to estimate an available volume of the container based on the three-dimensional model, and the guidance map may identify the one or more next poses to locate corners of the available volume.

The subject may be a stack of boxes, the memory may further store instructions that cause the processor to count the number of boxes based on the three-dimensional model, and the guidance map may identify the one or more next poses to identify boxes having low coverage.

According to one embodiment of the present invention, a method for providing guided scanning includes: controlling, by a processor, a camera to capture one or more initial images of a subject from a first pose of the camera; computing, by the processor, a guidance map in accordance with the one or more initial images to identify one or more next poses; controlling, by the processor, the camera to capture one or more additional images from at least one of the one or more next poses; updating, by the processor, the guidance map in accordance with the one or more additional images; and outputting the images captured by the camera to generate a three-dimensional model.

The method may further include providing visual feedback to a user through a display coupled to the processor, the feedback including a graphical representation of the one or more next poses of the guidance map.

The subject may be a container, the method may further include estimating an available volume of the container based on the three-dimensional model, and the guidance map may identify the one or more next poses to locate corners of the available volume.

The subject may be a stack of boxes, the method may further include counting the number of boxes based on the three-dimensional model, and the guidance map may identify the one or more next poses to identify boxes having low coverage.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, together with the specification, illustrate exemplary embodiments of the present invention, and, together with the description, serve to explain the principles of the present invention.

FIG. 4B illustrates one circumstance in which a computed vertical envelope does not contain the whole object being scanned.

DETAILED DESCRIPTION

Figure 1A:
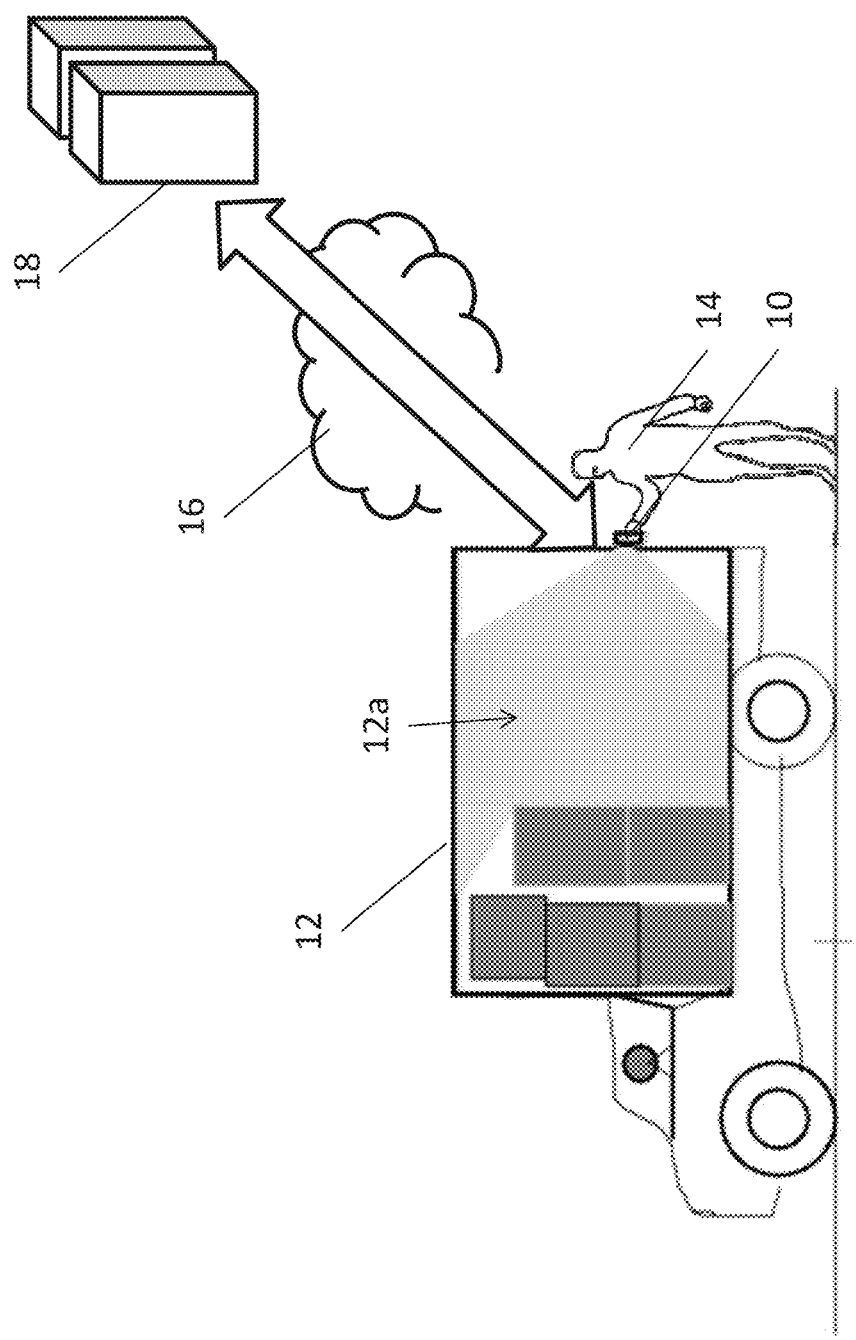
FIG. 1A is a schematic view of a process, according to one embodiment of the present invention, for scanning a scene.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

In many commercial and industrial applications, imaging methods and computer vision can be used to understand the physical properties of objects and scenes such as physical measurements. Using standard two-dimensional (2D) color cameras can provide a useful image to start, but a 2D image does not preserve real world measurements. The use of a depth camera, which provides depth information at every picture element or pixel (e.g., the distance from camera of every pixel), addresses this problem by enabling an image processing module to measure the dimensions of objects in the scene. However, a single depth image may still not be enough to capture all aspects of the geometry of a scene. For example, regions of low detail may result in ambiguities, and occlusions (e.g., objects or portions of the scene that block other objects) may hide the shape of other objects.

As such, aspects of embodiments of the present invention are directed to systems and methods to quickly build a complete or partial three-dimensional model of an object and/or a scene by aggregating depth (and, in some embodiments, color) information from multiple views (e.g., multiple positions or poses). For example, embodiments of the present invention can be applied to scanning objects on a flat surface (e.g., small objects on a desk or a table), which may be referred to herein as a "ground plane." Embodiments of the present invention may also be used to scan large scene such as rooms or a collection of objects occupying a large area, such as a collection of boxes on a warehouse pallet or shelves containing objects such as boxes.

To build a successful (or sufficiently useful) 3D model, aspects of embodiments of the present invention are directed to providing assistance or guidance to suggest a good path to move the camera during scanning. This path is computed in order to accelerate or to maximize the speed of capture (e.g., avoid duplications or redundant capture of portions of the scene that have sufficient information), and to reduce the possibility of failing to capture important views of the object and/or scene that is relevant to the usage goal of the final model. In some embodiments, the guidance is used to provide feedback to a human operator, for example, via a display device. In other embodiments, the guidance is used to automatically control the position of a depth camera that is, for example, mounted on a controllable robot arm. This methodology provides a user friendly or automated way to acquire reliable and accurate scans of objects and scenes.

Embodiments of the present invention have applications in fields such as logistics, inventory management, and product catalogs or listings.

For example, in logistics applications, embodiments of the present invention may be applied to capture 3D scans of warehouse shelves to count the boxes on those shelves and to capture 3D scans of shipping containers or truck cargo holds to estimate the remaining available space. If these situations were analyzed through a single view by any imaging system, whether 2D or 3D, the results would likely be unreliable because the single view likely leaves many ambiguities as to the shape of the scanned scene. Furthermore, without guidance, a user may not understand what additional views would be needed to resolve those ambiguities. The user friendly nature of scanning systems according to embodiments of the present invention allows warehouse employees to generate accurate results by capturing views from multiple angles without extensive training.

FIG. 1A is a schematic view of a process according to one embodiment of the present invention for scanning a scene. In particular, FIG. 1A illustrates the use of a scanning system 10 to scan an interior of a cargo area of a box truck 12. In some embodiments, the scanning system 10 includes a camera, a display screen, memory, and a processing unit or processor. The user 14 can freely move the scanning system 10 over a path that captures images of the scene from multiple different poses, thereby resulting in multiple views. The scanning system 10 can assist the user in moving the scanning system over a path that efficiently provides good results. For example, when scanning the interior of the cargo area of the box truck to estimate the unoccupied volume, the path may be designed to capture aspects of the scene that are particularly useful for calculating that volume. This guidance can be provided as real-time feedback shown on the display screen of the scanning system 10.

The multiple views are combined to generate a 3D model of the scene of the interior of the cargo area of the truck 12. The resulting 3D model can then be used to estimate the available space or volume 12a of the cargo area of the truck. A similar application would be the scanning of the interior of a shipping container such as an intermodal container (e.g., a 20 foot or 40 foot container).

The storage, processing, and display of the 3D scanning result can be performed substantially in the device. However because generating the 3D model may be computationally expensive, in some embodiments available communication interfaces of the device are used to transmit raw or partially processed data, using a local-area-network (LAN) or wide-area-network (WAN, e.g., the Internet) 16, to a remote (or "offline") processor 18. The remote processor 18, typically having much higher processing power and storage capabilities than the scanning system 10, can quickly optimize and finalize the 3D scan, and can provide this service to multiple scanning systems. For instance, the scanning system 10 can produce a 3D cloud (an aggregated and aligned collection of 3D XYZ measurements from different views of the subject) and color images from calculated camera positions, send the 3D cloud to the remote processor 18. The remote processor 18 can produce a polygon mesh of the subject and perform texture mapping to apply actual color to the 3D scan. The results can be presented to the users directly from the servers, or sent back to the scanning system 10 for display and manipulation on the device. In some embodiments, the scanning system 10, computes the desired values (such as the available space of the truck) based on the received 3D model. In other embodiments, the remote processor 18 also calculates the application specific values As still another example, in the application of product catalogs or listings, a 3D model of a product being sold can be used by a buyer to develop a better understanding of the size and shape of the product. See, for example, U.S. Patent Application Ser. No. 62/412,075 "CONTEXTUAL 3D MODEL STAGING," the entire disclosure of which is incorporated herein by reference. Embodiments of the present invention provide a user friendly way to generate accurate models of the products for sale, which may be used to supplement a product listing in a catalog (e.g., a product listing on a website).

Figure 1B:
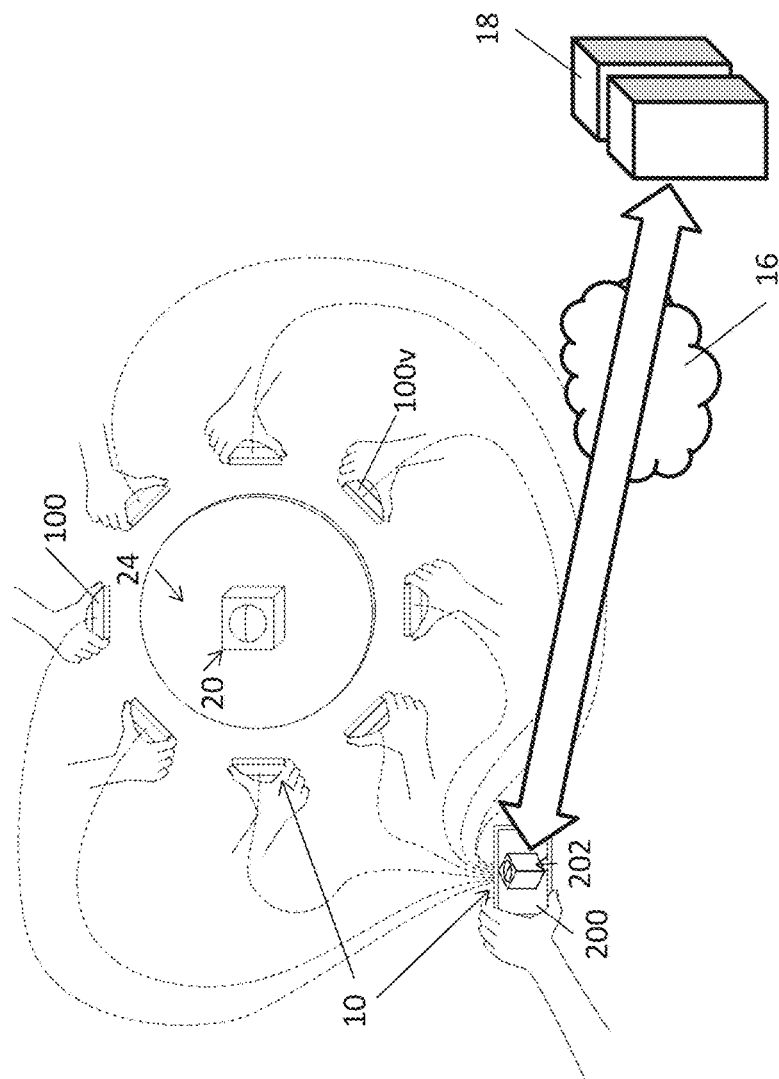
FIG. 1B is a schematic view of a process, according to one embodiment of the present invention, for scanning an object.

FIG. 1B is a schematic view of a process according to one embodiment of the present invention for scanning an object. As shown in FIG. 1B, the scanning system 10 includes a display component 200 and a detachable scanning component 100. The scanning component is freely moved to different poses (e.g., eight different poses are shown in FIG. 1B) in order to capture different views of the object 20 that is resting on a table, which serves as a ground plane 24. The term 'freely' implies that there are many trajectories to move the camera in front or around the subject. In one embodiment, the scanning system assists the user by providing the user with a path around the object that can efficiently produce good results.

As with the embodiment shown in FIG. 1A, in some embodiments the captured views are transmitted (for example, over the internet 16) to a remote processor 18 to generate a 3D model, and the 3D model may be transmitted back to the scanning device 10 and displayed 202 on the display component 200 of the scanning system 10.

Depth Camera Scanning Systems

Among the camera types used for scanning, one can use an ordinary color camera, a depth (or range) camera or a combination of depth and color camera. The latter is typically called RGB-D where RGB stands for the color image and D stands for the depth image (where each pixel encodes the depth (or distance) information of the scene.) The depth image can be obtained by different methods including geometric or electronic methods. Examples of geometric methods include passive or active stereo camera systems and structured light camera systems. Examples of electronic methods to capture depth image include Time of Flight (TOF), or general scanning or fixed LIDAR cameras.

Some embodiments of the present invention are directed to hand-held 3D scanners. Such hand-held 3D scanners may include a depth camera (a camera that computes the distance of the surface elements imaged by each pixel) together with software that can register multiple depth images of the same surface to create a 3D representation of a possibly large surface or of a complete object. Users of hand-held 3D scanners need to move it to different positions around the object and orient it so that all points in the object's surface are covered (e.g., the surfaces are seen in at least one depth image taken by the scanner). In addition, it is important that each surface patch receive a high enough density of depth measurements (where each pixel of the depth camera provides one such depth measurement). The density of depth measurements depends on the distance from which the surface patch has been viewed by a camera, as well as on the angle or slant of the surface with respect to the viewing direction or optical axis of the depth camera.

Figure 1C:
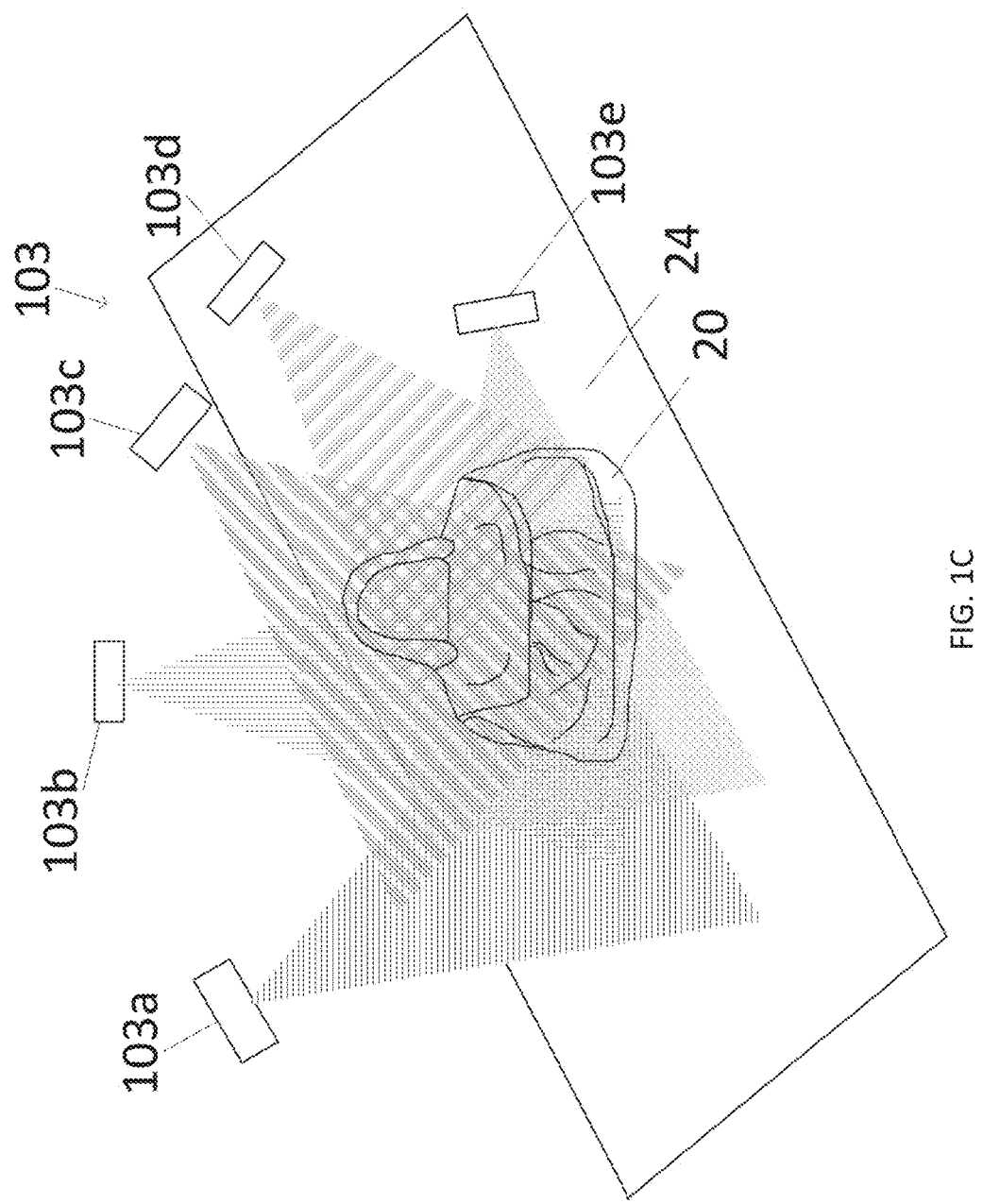
FIG. 1C is a schematic diagram of an arrangement of five cameras according to one embodiment of the present invention to image a portion of a scene that includes an object to be scanned.

Some embodiments of the present invention are directed to systems and methods for identifying poses for multiple cameras that are strategically posed to capture the key parts of a scene, where each pose may include a position and an orientation. In this case, an arrangement of cameras that efficiently captures the key parts of the scene (e.g., an optimal set of poses) are determined a priori. FIG. 1C is a schematic diagram of an arrangement of five cameras 103a, 103b, 103c, 103d, and 103e (collectively 103) according to one embodiment of the present invention to image a portion of a scene that includes an object 20 to be scanned. Each of the cameras may have a corresponding pose that includes a three dimensional position in space and an orientation (e.g., pitch, yaw, and roll). The cameras are arranged with different poses to capture all of the relevant surfaces of the object 20 (in the embodiment shown in FIG. 1C, a purse). The relevant surfaces may be, for example, all of the surfaces of the object 20, excluding the surface on, or obscured by, the ground plane 24 that the object 2[ is resting on. Aspects of embodiments of the present invention are directed to automatically identifying these poses (e.g., fixed poses) of the cameras 103 to be arranged around the object, such that all of the relevant surfaces of similar objects (e.g., other purses of the same style on an assembly line or conveyer belt) can be imaged without moving the cameras from their poses.

Figure 2A:
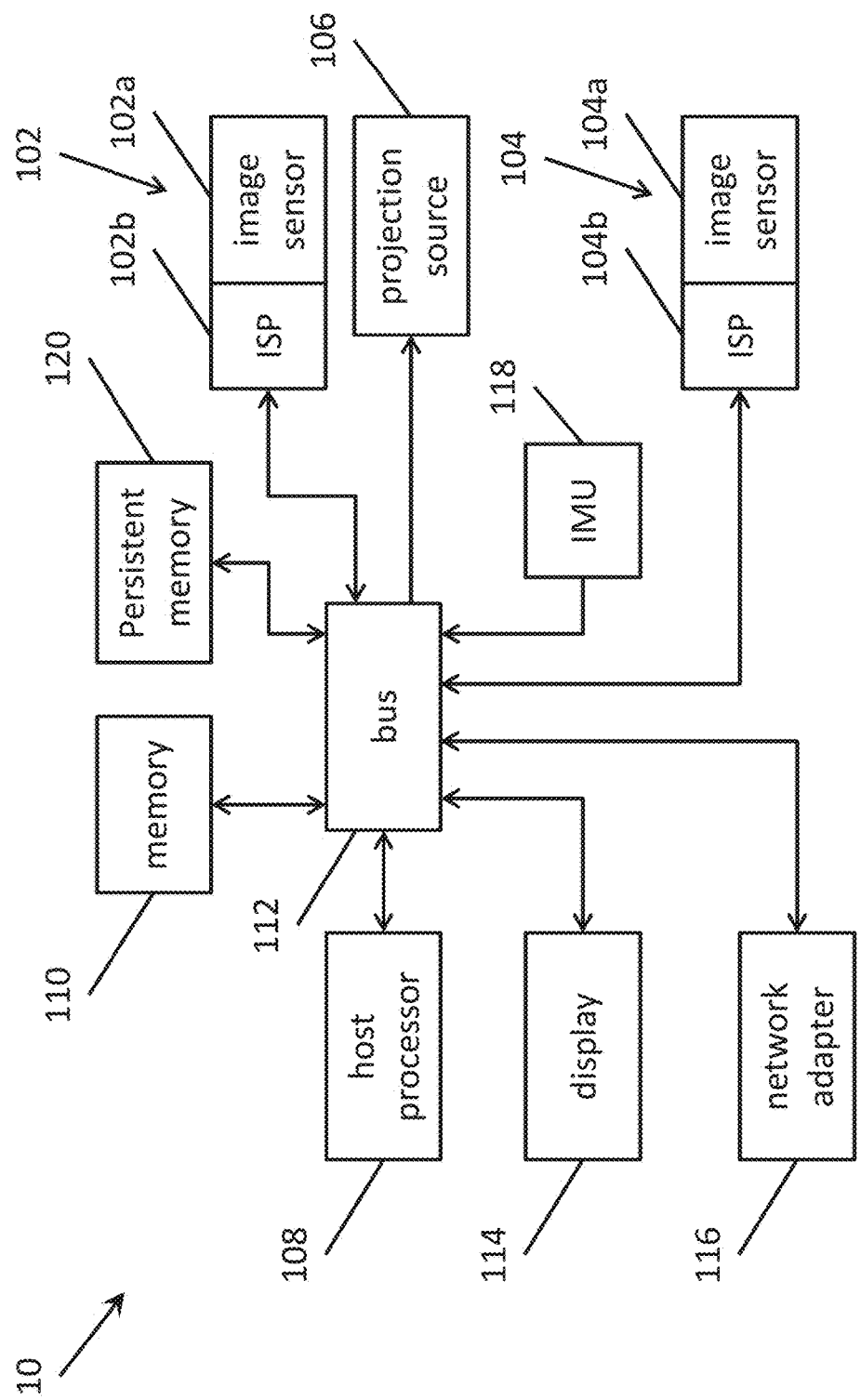
FIG. 2A is a block diagram of a scanning system according to one embodiment of the present invention.

FIG. 2A is a block diagram of a scanning system as a stereo depth camera system according to one embodiment of the present invention.

Figure 2B:
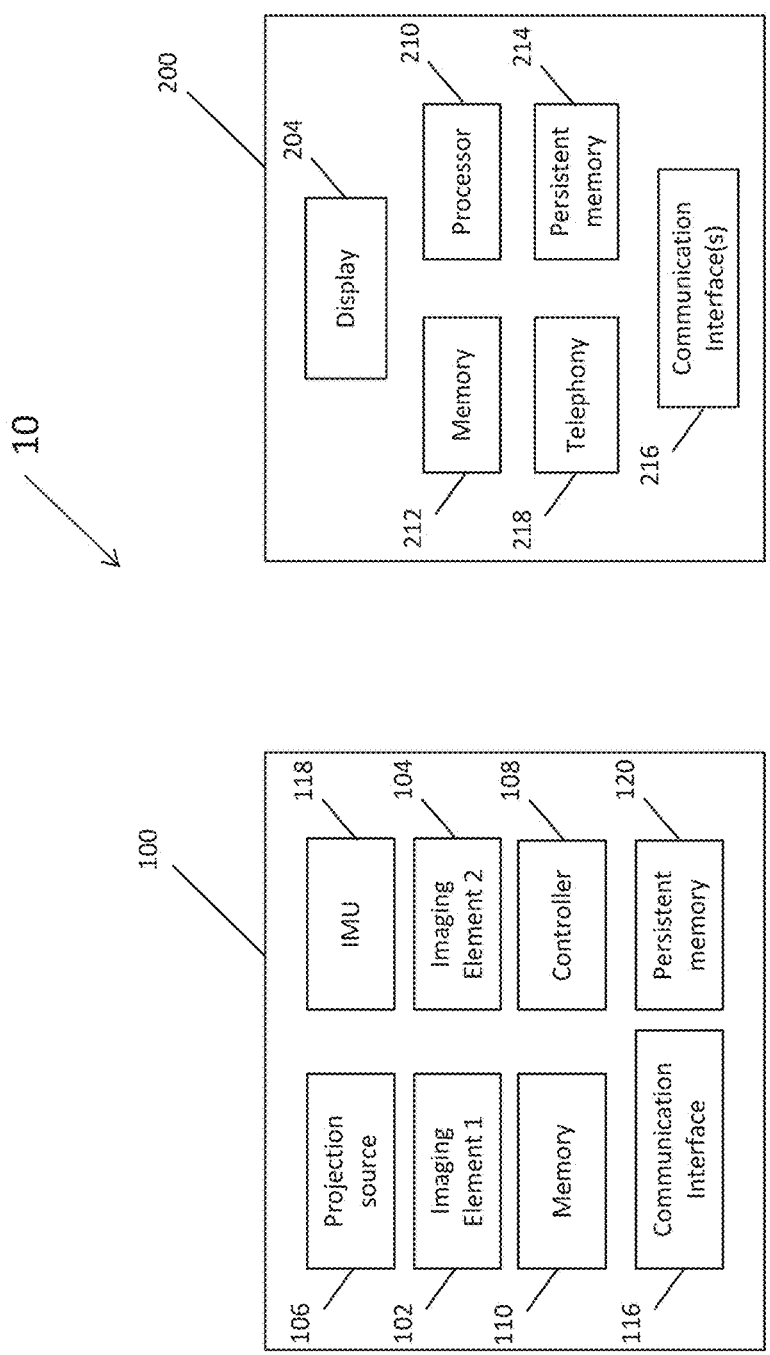
FIG. 2B is a block diagram of a scanning system having a detachable scanning sensor according to one embodiment of the present invention.

The scanning system 10 shown in FIG. 2B includes a first camera 102, a second camera 104, a projection source 106 (or illumination source or active projection system), and a host processor 108 and memory 110, wherein the host processor may be, for example, a graphics processing unit (GPU), a more general purpose processor (CPU), an appropriately configured field programmable gate array (FPGA), or an application specific integrated circuit (ASIC). The first camera 102 and the second camera 104 may be rigidly attached, e.g., on a frame, such that their relative positions and orientations are substantially fixed. The first camera 102 and the second camera 104 may be referred to together as a "depth camera." The first camera 102 and the second camera 104 include corresponding image sensors 102a and 104a, and may also include corresponding image signal processors (ISP) 102b and 104b. The various components may communicate with one another over a system bus 112. The image capture system 100 may include additional components such as a display 114 to allow the device to display images, a network adapter 116 to communicate with other devices, an inertial measurement unit (IMU) 118 such as a gyroscope to detect acceleration of the scanning system 10 (e.g., detecting the direction of gravity to determine orientation and detecting movements to detect position changes), and persistent memory 120 such as NAND flash memory for storing data collected and processed by the scanning system 10. The IMU 118 may be of the type commonly found in many modern smartphones. The image capture system may also include other communication components, such as a universal serial bus (USB) interface controller.

In some embodiments, the image sensors 102a and 104a of the cameras 102 and 104 are RGB-IR image sensors. Image sensors that are capable of detecting visible light (e.g., red-green-blue, or RGB) and invisible light (e.g., infrared or IR) information may be, for example, charged coupled device (CCD) or complementary metal oxide semiconductor (CMOS) sensors. Generally, a conventional RGB camera sensor includes pixels arranged in a "Bayer layout" or "RGBG layout," which is 50% green, 25% red, and 25% blue. Band pass filters (or "micro filters") are placed in front of individual photodiodes (e.g., between the photodiode and the optics associated with the camera) for each of the green, red, and blue wavelengths in accordance with the Bayer layout. Generally, a conventional RGB camera sensor also includes an infrared (IR) filter or IR cut-off filter (formed, e.g., as part of the lens or as a coating on the entire image sensor chip) which further blocks signals in an IR portion of electromagnetic spectrum.

An RGB-IR sensor is substantially similar to a conventional RGB sensor, but may include different color filters. For example, in an RGB-IR sensor, one of the green filters in every group of four photodiodes is replaced with an IR band-pass filter (or micro filter) to create a layout that is 25% green, 25% red, 25% blue, and 25% infrared, where the infrared pixels are intermingled among the visible light pixels. In addition, the IR cut-off filter may be omitted from the RGB-IR sensor, the IR cut-off filter may be located only over the pixels that detect red, green, and blue light, or the IR filter can be designed to pass visible light as well as light in a particular wavelength interval (e.g., 840-860 nm). An image sensor capable of capturing light in multiple portions or bands or spectral bands of the electromagnetic spectrum (e.g., red, blue, green, and infrared light) will be referred to herein as a "multi-channel" image sensor.

In some embodiments of the present invention, the image sensors 102a and 104a are conventional visible light sensors. In some embodiments of the present invention, the system includes one or more visible light cameras (e.g., RGB cameras) and, separately, one or more invisible light cameras (e.g., infrared cameras, where an IR band-pass filter is located across all over the pixels).

Generally speaking, a stereoscopic depth camera system includes at least two cameras that are spaced apart from each other and rigidly mounted to a shared structure such as a rigid frame. The cameras are oriented in substantially the same direction (e.g., the optical axes of the cameras may be substantially parallel) and have overlapping fields of view. These individual cameras can be implemented using, for example, a complementary metal oxide semiconductor (CMOS) or a charge coupled device (CCD) image sensor with an optical system (e.g., including one or more lenses) configured to direct or focus light onto the image sensor. The optical system can determine the field of view of the camera, e.g., based on whether the optical system is implements a "wide angle" lens, a "telephoto" lens, or something in between.

In the following discussion, the image acquisition system of the depth camera system may be referred to as having at least two cameras, which may be referred to as a "master" camera and one or more "slave" cameras. Generally speaking, the estimated depth or disparity maps computed from the point of view of the master camera, but any of the cameras may be used as the master camera. As used herein, terms such as master/slave, left/right, above/below, first/second, and CAM1/CAM2 are used interchangeably unless noted. In other words, any one of the cameras may be master or a slave camera, and considerations for a camera on a left side with respect to a camera on its right may also apply, by symmetry, in the other direction. In addition, while the considerations presented below may be valid for various numbers of cameras, for the sake of convenience, they will generally be described in the context of a system that includes two cameras. For example, a depth camera system may include three cameras. In such systems, two of the cameras may be invisible light (infrared) cameras and the third camera may be a visible light (e.g., a red/blue/green color camera) camera. The third camera may be optically registered (e.g., calibrated) with the first and second cameras. One example of a depth camera system including three cameras is described in U.S. patent application Ser. No. 15/147,879 "Depth Perceptive Trinocular Camera System" filed in the United States Patent and Trademark Office on May 5, 2016, the entire disclosure of which is incorporated by reference herein.

To detect the depth of a feature in a scene imaged by the cameras, the depth camera system determines the pixel location of the feature in each of the images captured by the cameras. The distance between the features in the two images is referred to as the disparity, which is inversely related to the distance or depth of the object. (This is the effect when comparing how much an object "shifts" when viewing the object with one eye at a time—the size of the shift depends on how far the object is from the viewer's eyes, where closer objects make a larger shift and farther objects make a smaller shift and objects in the distance may have little to no detectable shift.) Techniques for computing depth using disparity are described, for example, in R. Szeliski. "Computer Vision: Algorithms and Applications", Springer, 2010 pp. 467 et seq.

The magnitude of the disparity between the master and slave cameras depends on physical characteristics of the depth camera system, such as the pixel resolution of cameras, distance between the cameras and the fields of view of the cameras. Therefore, to generate accurate depth measurements, the depth camera system (or depth perceptive depth camera system) is calibrated based on these physical characteristics.

In some depth camera systems, the cameras may be arranged such that horizontal rows of the pixels of the image sensors of the cameras are substantially parallel. Image rectification techniques can be used to accommodate distortions to the images due to the shapes of the lenses of the cameras and variations of the orientations of the cameras.

In more detail, camera calibration information can provide information to rectify input images so that epipolar lines of the equivalent camera system are aligned with the scanlines of the rectified image. In such a case, a 3D point in the scene projects onto the same scanline index in the master and in the slave image. Let $u_m$ and $u_s$ be the coordinates on the scanline of the image of the same 3D point p in the master and slave equivalent cameras, respectively, where in each camera these coordinates refer to an axis system centered at the principal point (the intersection of the optical axis with the focal plane) and with horizontal axis parallel to the scanlines of the rectified image. The difference $u_s - u_m$ is called disparity and denoted by d; it is inversely proportional to the orthogonal distance of the 3D point with respect to the rectified cameras (that is, the length of the orthogonal projection of the point onto the optical axis of either camera).

Stereoscopic algorithms exploit this property of the disparity. These algorithms achieve 3D reconstruction by matching points (or features) detected in the left and right views, which is equivalent to estimating disparities. Block matching (BM) is a commonly used stereoscopic algorithm. Given a pixel in the master camera image, the algorithm computes the costs to match this pixel to any other pixel in the slave camera image. This cost function is defined as the dissimilarity between the image content within a small window surrounding the pixel in the master image and the pixel in the slave image. The optimal disparity at point is finally estimated as the argument of the minimum matching cost. This procedure is commonly addressed as Winner-Takes-All (WTA). These techniques are described in more detail, for example, in R. Szeliski. "Computer Vision: Algorithms and Applications", Springer, 2010. Since stereo algorithms like BM rely on appearance similarity, disparity computation becomes challenging if more than one pixel in the slave image have the same local appearance, as all of these pixels may be similar to the same pixel in the master image, resulting in ambiguous disparity estimation. A typical situation in which this may occur is when visualizing a scene with constant brightness, such as a flat wall.

Methods exist that provide additional illumination by projecting a pattern that is designed to improve or optimize the performance of block matching algorithm that can capture small 3D details such as the one described in U.S. Pat. No. 9,392,262 "System and Method for 3D Reconstruction Using Multiple Multi-Channel Cameras," issued on Jul. 12, 2016, the entire disclosure of which is incorporated herein by reference. Another approach projects a pattern that is purely used to provide a texture to the scene and particularly improve the depth estimation of texture-less regions by disambiguating portions of the scene that would otherwise appear the same.

The projection source 106 according to embodiments of the present invention may be configured to emit visible light (e.g., light within the spectrum visible to humans and/or other animals) or invisible light (e.g., infrared light) toward the scene imaged by the cameras 102 and 104. In other words, the projection source may have an optical axis substantially parallel to the optical axes of the cameras 102 and 104 and may be configured to emit light in the direction of the fields of view of the cameras 102 and 104. An invisible light projection source may be better suited to for situations where the subjects are people (such as in a videoconferencing system) because invisible light would not interfere with the subject's ability to see, whereas a visible light projection source may shine uncomfortably into the subject's eyes or may undesirably affect the experience by adding patterns to the scene. Examples of systems that include invisible light projection sources are described, for example, in U.S. patent application Ser. No. 14/788,078 "Systems and Methods for Multi-Channel Imaging Based on Multiple Exposure Settings," filed in the United States Patent and Trademark Office on Jun. 30, 2015, the entire disclosure of which is herein incorporated by reference.

Active projection sources can also be classified as projecting static patterns, e.g., patterns that do not change over time, and dynamic patterns, e.g., patterns that do change over time. In both cases, one aspect of the pattern is the illumination level of the projected pattern. This may be relevant because it can influence the depth dynamic range of the depth camera system. For example, if the optical illumination is at a high level, then depth measurements can be made of distant objects (e.g., to overcome the diminishing of the optical illumination over the distance to the object, by a factor proportional to the inverse square of the distance) and under bright ambient light conditions. However, a high optical illumination level may cause saturation of parts of the scene that are close-up. On the other hand, a low optical illumination level can allow the measurement of close objects, but not distant objects.

FIG. 2B is a block diagram of a scanning system as a stereo camera system according to one embodiment of the present invention according to one embodiment of the present invention. In the embodiment shown in FIG. 2B, as in FIG. 1B, the scanning system 10 includes two components: a detachable scanning component 100 and a display component 200. In some embodiments, the display component 200 is a computer system, such as a smartphone, a tablet, a personal digital assistant, or other similar systems.

Scanning systems using separable scanning and display components are described in more detail in, for example, U.S. patent application Ser. No. 15/382,210 "3D Scanning Apparatus Including Scanning Sensor Detachable from Screen" filed in the United States Patent and Trademark Office on Dec. 16, 2016, the entire disclosure of which is incorporated by reference.

Although embodiments of the present invention are described herein with respect to stereo depth camera systems, embodiments of the present invention are not limited thereto and may also be used with other depth camera systems such as time of flight cameras and LIDAR cameras.

Depending on the choice of camera, different techniques may be used to generate the 3D model. For example, Dense Tracking and Mapping in Real Time (DTAM) uses color cues for scanning and Simultaneous Localization and Mapping uses depth data (or a combination of depth and color data) to generate the 3D model.

Method of Operation

Figure 3:
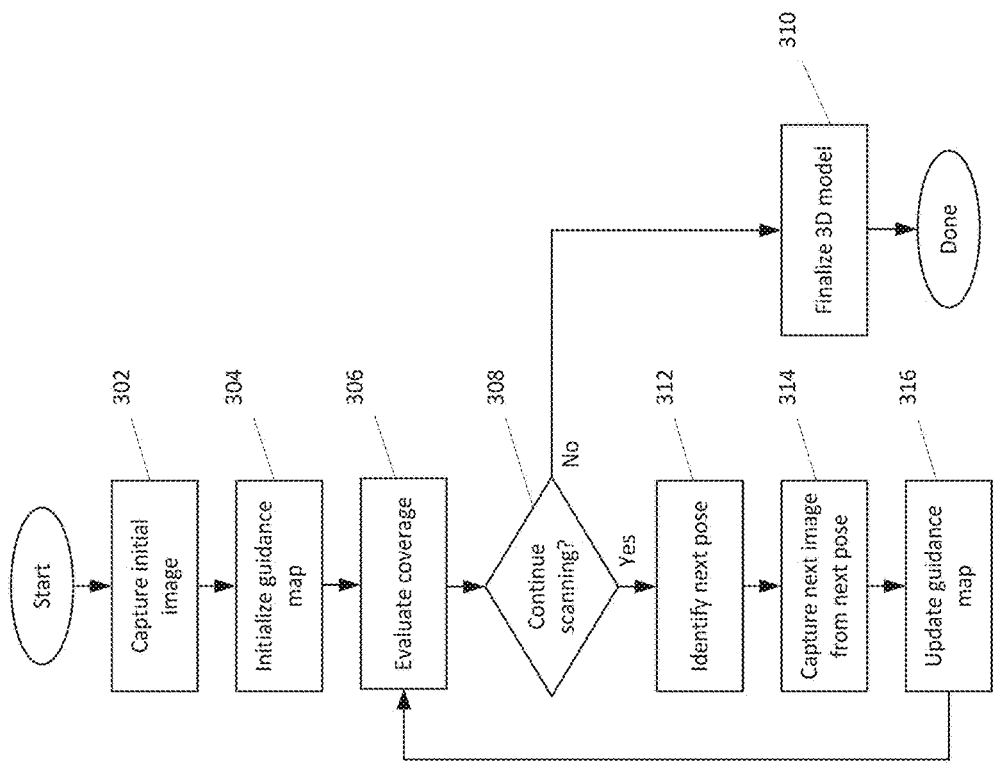
FIG. 3 is a flowchart of a method for performing a scan according to one embodiment of the present invention.

FIG. 3 is a flowchart of a method for performing a scan according to one embodiment of the present invention. In some embodiments of the present invention, instructions (e.g., a computer program) stored in the memory of the scanning system 10 are executed by a processor and/or a controller of the scanning system to perform the various operations of the method. In other embodiments of the present invention, some or all of the operations may be performed by other types of processing devices, such as an application specific integrated circuit (ASIC), a field programmable gate array (FPGA), a graphical processing unit (GPU), and the like.

For the sake of convenience, the method will be described below in the context of the scanning systems 10 described above with respect to FIGS. 2A and 2B, and in particular stereo depth camera system. however, embodiments of the present invention are not limited thereto, and can be applied to other camera systems that estimate depth from one or more views. In the below discussion, it is assumed that the images of the object and/or scene are captured with the same camera from different vantage points or poses or the multiple cameras (e.g., a stereo camera system) from different vantage points or poses. However, embodiments of the present invention are not limited thereto and may be applied in circumstances of images captured from a single camera or images captured from multiple cameras used to capture the same subject (e.g., an object or scene), or combinations thereof.

Aspects of embodiments of the invention are directed to monitoring the coverage and the measurement density of different patches of surfaces of the subject (e.g., an object or scene) being scanned, and to provide guidance via an appropriate user interface as to where to move the scanner in order to quickly and efficiently cover the whole surface and to ensure sufficient density of measurements. By following directions from methods according to embodiments of the present invention, a user can reduce the risk of missing portions of the object or surfaces of the scene, or of under-sampling some surfaces. The method also avoids or reduces capturing surfaces that are already covered very well, thereby addressing the over-sampling problem. Consequently, the overall time of producing a well-formed 3D scan is reduced or minimized.

Referring to FIG. 3, in operation 302, the processor (e.g., the host processor 108 in FIG. 2A or the processor 210 working in concert with the controller 108 of FIG. 2B) controls the scanning device to capture an initial image. The processor may control cameras 102 and 104 to capture images at substantially the same time and use the captured images to compute a depth image using image disparity techniques as described above, where the depth image is the initial image. In some circumstances, the projection source 106 may be controlled to provide additional illumination during the capture of the image.

In operation 304, the processor initializes a guidance map based on the depth image captured in operation 302. Because the depth image includes depth information, this image is, in some sense, already a 3D model. The guidance map is a representation of the progress of the scan that may be used to identify one or more additional poses of the camera for additional images to improve the scan. In some embodiments, an "envelope" is used to define the shape of the guidance map. In some embodiments, processor may also use the initial image to define the envelope, which represents a summary description of the shape of the subject (e.g., object or scene) to be scanned. This envelope can be obtained in multiple ways. For example, the initial image may be used to define a virtual surface (e.g., cylindrical, spherical, or hemispherical dome) surrounding the object to be scanned or the portion of the scene to be scanned, where the initial image is used to determine the general outline of the scene or object. In some embodiments, the initial image may be captured along an optical axis perpendicular to the ground plane that the object is resting on (e.g., a top-view of the object). In some embodiments, when imaging scenes or large objects, such as shelves, a stack of boxes, and the interior of a room or a container, the initial image may be a frontal view or a region of interest selected by the user instead of the top-view. The shape envelope can be kept fixed during the scanning process, or can be incrementally refined as more 3D data is acquired.

In some embodiments, the initial 3D model and envelope are created based on a quick 3D scan by moving the scanning system along a path to acquire the approximate, coarse shape of the subject (e.g., an object or scene). Because this quick scan is used to initialize the process, issues of low coverage and under-sampling associated with this initial scan will be addressed and corrected through the process.

Figure 4A:
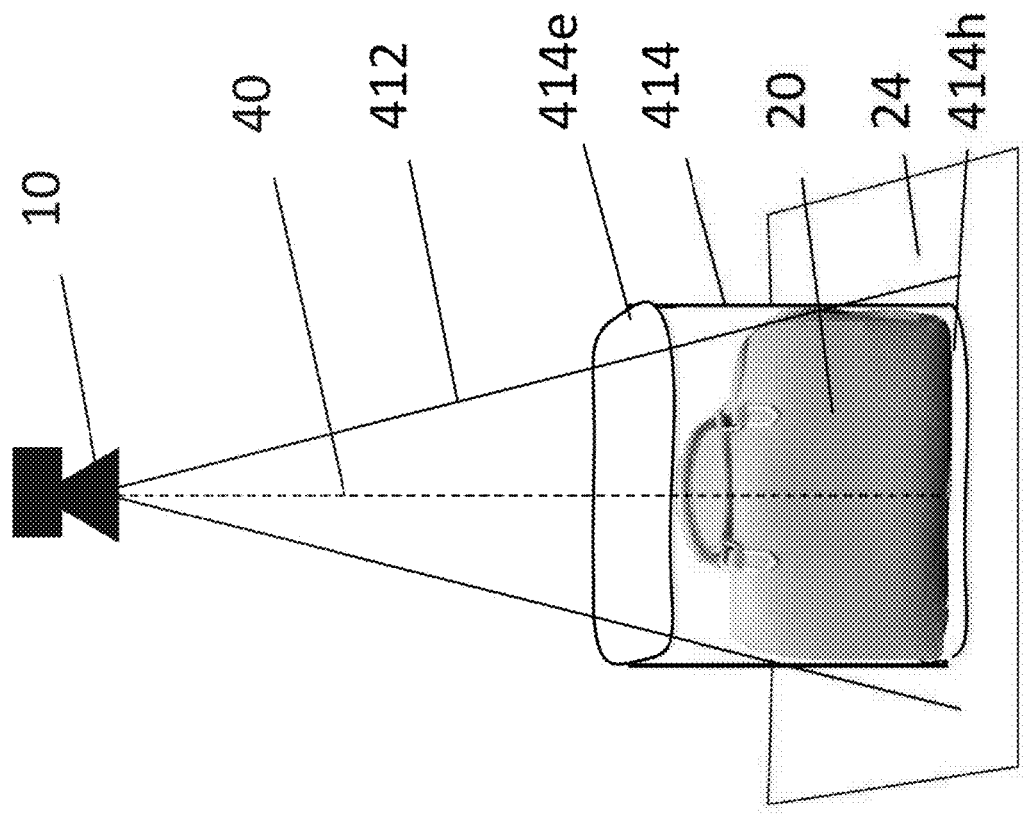
FIG. 4A illustrates the capture of an initial image of an object to define a cylindrical envelope according to one embodiment of the present invention.
Figure 4A:
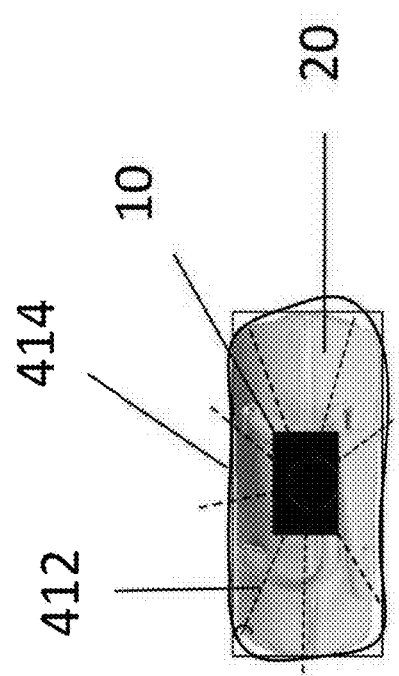

FIG. 4A illustrates the capture of an initial image of an object to define a cylindrical envelope according to one embodiment of the present invention. As shown in FIG. 4A, the scanning system 10 captures an image of an object 20 from a top-view, e.g., along an optical axis 40 that is substantially perpendicular to a ground plane 24.

Based on the initial depth image captured from the top-view, and assuming that the object is lying on a substantially flat surface or ground plane 24 (e.g. a desk top), it is possible to build an approximate 3D "vertical envelope" 414 of the object 20 as seen from above. To construct this vertical envelope 414, for each 3D point measured by the depth camera of the scanning system 10 in the top-view, the processor computes the vertical projection of the 3D point onto the ground plane 24 (called generator). In some embodiments, the processor determines the vertical direction to be parallel to the optical axis of the scanning system during the initial capture of a single image. In other embodiments of the invention that include an inertial measurement unit IMU 118, the vertical direction may be set as being parallel to the gravity vector. In embodiments using a detachable scanning component 100 as shown in FIG. 2B, the detachable scanning component 100 may lack an IMU 118 and the display component 200 may include an IMU 118 (e.g., if the display component 200 is a smartphone). In such a case, the initial image may be captured with the detachable scanning component 100 physical and rigidly connected to the display component 200 such that the initial image is captured with orientation information from the IMU 118.

By projecting each 3D point of the object onto the ground plane, the processor computes a convex planar envelope (or hull) of the generators. The vertical lines through the vertices of this hull define a generalized cylinder (e.g., a volume having two parallel ends that are closed curves of the same shape, such as a convex shape, and a surface that extends between the two ends along a direction perpendicular to the planes of the two ends). This generalized cylinder will be referred to herein as the canonical vertical envelope of the object. As shown in FIG. 4A, the envelope 414 is a generalized cylinder having ends 414e and 414h in the shape of a convex hull.

For the sake of convenience, it is assumed that the envelope 414 contains the entire object 20. However, there may be cases where this is not true, such as if the object 20 is slightly wider at the bottom (e.g., near the ground plane 24). FIG. 4B illustrates one circumstance in which a computed vertical envelope does not contain the whole object being scanned. As shown in FIG. 4B, the object 20' has the general shape of a truncated cone, shown in gray, such that the rays from the camera touching the upper circular edge of the object are tangent to its side surface. The cylindrical envelope (formed by orthogonal projection of the points measured in the upper circular edge 414e to the ground plane) forms the cylinder 414 shown with dark edges. In this case, the cylindrical envelope 414 does not contain the object 20' in its entirety.

To address circumstances in which the cylindrical envelope does not encompass the entire object, in some embodiments of the present invention, the processor updates the cylindrical envelope 414 to encompass the entire object 20' as more information about the object 20' is collected from the other views (for instance, side views) during the scanning.

Figure 4C:
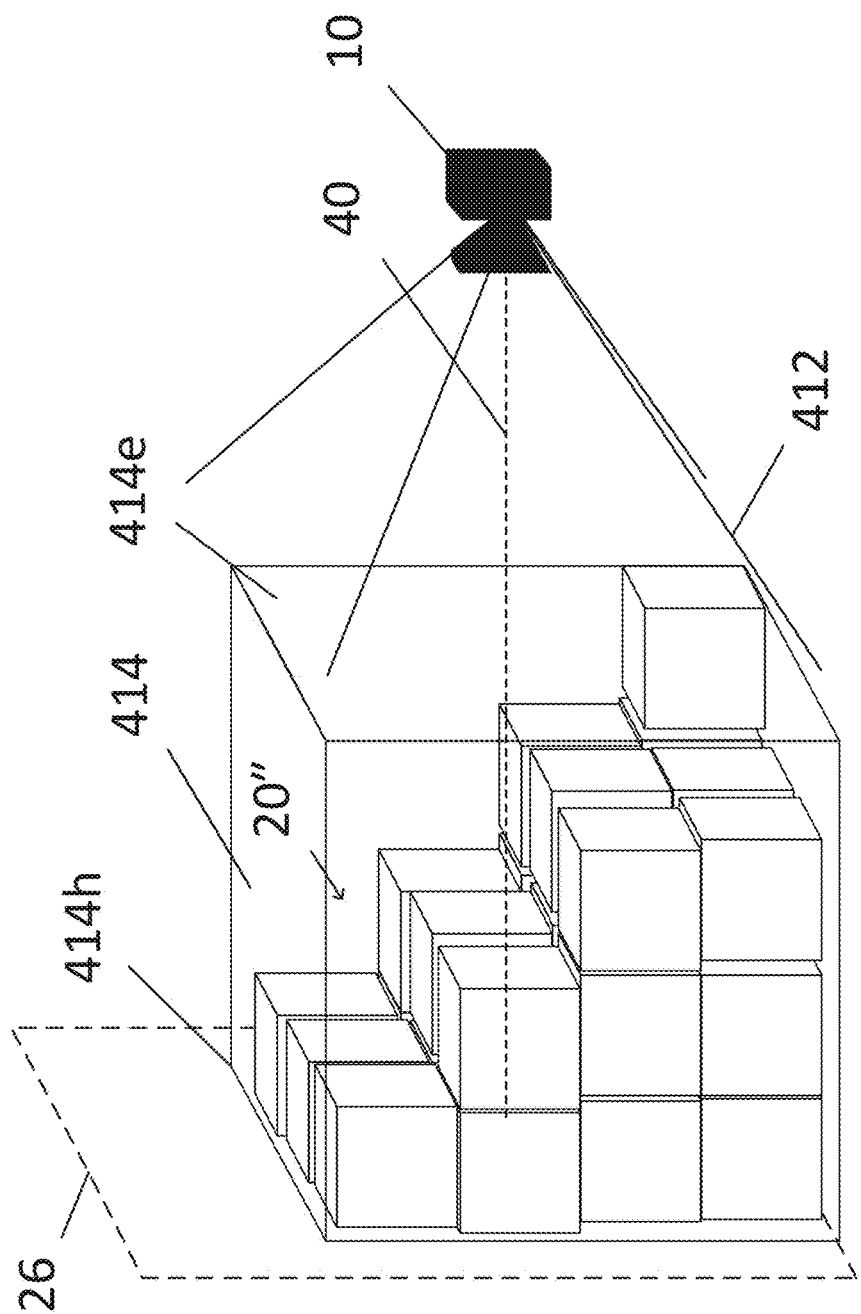
FIG. 4C illustrates the capture of an initial image of a scene to define a cylindrical envelope according to one embodiment of the present invention.

As discussed above, in some circumstances, embodiments of the present invention are used to scan a scene rather than a relatively small object. FIG. 4C illustrates the capture of an initial image of a scene to define a cylindrical envelope according to one embodiment of the present invention. In FIG. 4C, the scanning system 10 captures an image of a scene, here a stack of boxes 20", from a side-view. The side-view may be used in this case because it is impractical to obtain a top-view of the boxes (e.g., doing so may require a ladder or a forklift). In the example shown in FIG. 4C, the optical axis 40 of the depth camera of the scanning system 10 is substantially parallel to the actual ground (e.g., perpendicular to gravity), but embodiments of the present invention are not limited thereto, and the depth camera may be oriented at any other angle. For the sake of convenience, a virtual background plane 26 may be defined to be perpendicular to the optical axis 40 of the depth camera when the initial image is captured, at some distance from the depth camera. As such, the envelope 414 may be defined as a generalized cylinder (in this case, a rectangular prism). In a manner similar to that of scanning an object, the generalized cylindrical envelope may have parallel ends 414e and 414h that are connected by surfaces that are perpendicular to the ends.

Referring to FIG. 3, in operation 306, the 3D model is evaluated for quality, for example, in terms of coverage and density. As used herein, the "coverage" of a surface patch of the shape envelope refers to the resolution at which this patch was imaged by one or more camera poses. The term "global coverage" of the shape envelope, will be used herein to represent how well the surfaces of a subject (e.g., an object or scene) have been covered during the scanning process. The "incremental coverage" provided by a camera at a certain pose represents the improvement, in terms of global coverage of the shape, that is provided by capturing one more image from a camera at a certain pose, where "pose" represents both the location and orientation of the camera.

According to one embodiment of the present invention, in operation 306 the processor generates a representation (or map) of various potential camera poses, each with the associated incremental coverage value. This map predicts how much the global coverage of the subject (e.g., an object or scene) would be improved if an additional image (e.g., a depth image) were captured from a given pose. This map may contain all possible poses, or only a subset of such poses. In the case of embodiments that provide direct visual feedback, selecting an appropriate subset of poses to be mapped can simplify the presentation of this information to the user. For example, a half-sphere or encompassing dome centered at an object can represent the set of possible camera locations that are a fixed distance from the object center, where all cameras are oriented towards the object center.

Figure 5:
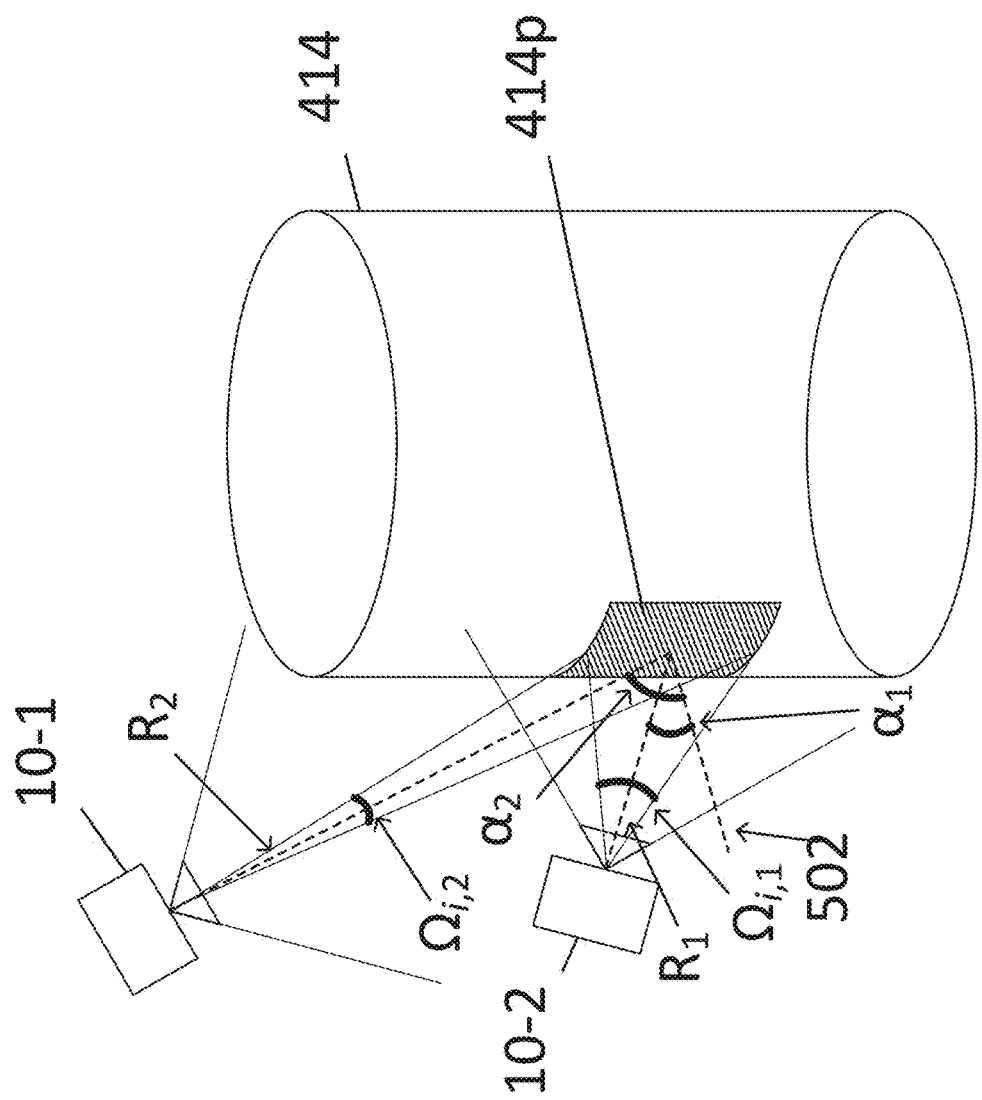
FIG. 5 illustrates the computation of coverage using a patch of the cylindrical envelope according to one embodiment of the present invention.

FIG. 5 illustrates the computation of coverage using a patch of the cylindrical envelope according to one embodiment of the present invention. According to one embodiment of the present invention, the processor defines a tessellation of the surface of the envelope 414, e.g., the surface of the cylinder as shown in FIG. 5, with cells or patches 414p of appropriate size. The sizes of the cells may be set based on the desired resolution of the 3D model, the resolution of the depth camera system, and the field of view of the depth camera system.

The processor assigns each tessellation cell to an index i as well as with a variable (coverage $\Omega_i$) that specifies whether this cell has been imaged by a depth camera, and the resolution at which this imaging process occurred. The coverage $\Omega_i$ is 0 if the cell has not been imaged by any camera. (Note that the term "cameras" is used to indicate any number of different cameras, or the same camera capturing images from multiple poses.) If the j-th camera has imaged the i-th patch, we can define the coverage $\Omega_{i,j}$ provided by this camera as the solid angle subtended by the patch, with vertex at the camera's optical center. This angle is proportional to the number of pixels in the camera that see that patch: larger angles thus result in higher imaging resolution for the same patch area. Denote by a the angle between the viewing direction and the patch's normal, by R the distance between the camera and the patch, and by A patch area. It is easily seen that $\Omega_{i,j} \approx A \cos \alpha / R^2$. These quantities are shown by way of example in FIG. 5. Other definitions for "coverage" may include considerations such as shadowing, occlusions, and illumination effects that may affect the quality of the depth reconstruction of a patch. If a patch has been imaged by multiple cameras, then largest value of coverage is recorded: $\Omega_i = \max_j \{\Omega_{i,j}\}$.

Referring to FIG. 5, the i-th patch 414p of the cylindrical envelope is visualized from two cameras (camera 10-1 and camera 10-2). The distances of the two cameras to the patch are $R_1$ and $R_2$, respectively; the angles between the lines of sight of the camera to the center of the patch and the normal 502 at the center of the patch are $\alpha_1$ and $\alpha_2$; the angles subtended by the patch from the cameras' centers are $\Omega_{i,1}$ and $\Omega_{i,2}$. Note that the angles $\Omega_{i,1}$ and $\Omega_{i,2}$ are proportional to the number of pixels in each camera that image the patch (and thus indicate the resolution at which the patch 414p is imaged.)

As such, the global coverage of the envelope that has been imaged by N cameras is defined as the sum of the coverage of all patches: $\Omega^{(N)} = \Sigma_i \Omega_i$.

An additional depth image of the object 20 from a new pose is likely to increase the global coverage of the object 20. This may be because some surface patches that were not imaged by any of the previous depth images are imaged by the new image; or because the depth image captures one or more patches with a higher resolution. The incremental coverage obtained by the N+1-th camera quantifies this concept: $\Delta\Omega^{N+1} = \Omega^{N+1} - \Omega^N$.

In operation 308, based on the evaluation of the quality of the model, the system determines whether scanning should continue or whether there is sufficient data to generate a good 3D model. As discussed above, an incremental coverage map) $\Delta\Omega^{N+1}(p)$ is a function that associates each possible camera pose p from which a new view could be obtained, with the incremental coverage that would be provided by this new view. Note that a pose p=(x, O) represents both the location x and orientation O of the camera system at the time of capture, and thus is characterized by six degrees of freedom (e.g., three dimensional coordinates for the location x and three dimensions for the orientation, such as pitch, yaw, and roll). The incremental coverage map may be used to provide guidance as to where to move the scanning system 10 in order to increase global coverage.

Given the large dimension of the space of poses (having six degrees of freedom), in some computationally constrained contexts, it may be expensive (in terms of computational cost) to compute a complete incremental coverage map $\Delta\Omega^{N+1}(p)$ that associates substantially every possible pose p with a value of incremental coverage. In addition, it may be difficult to communicate pose information to a user via an intuitive user interface.

As such, some embodiments of the present invention are directed to a reduced incremental coverage map that represents a subset of the possible poses, but that is still representative of a wide variety of poses. This reduced incremental coverage map may also be easy to communicate to the user via a user interface (e.g., a display device).

Figure 6A:
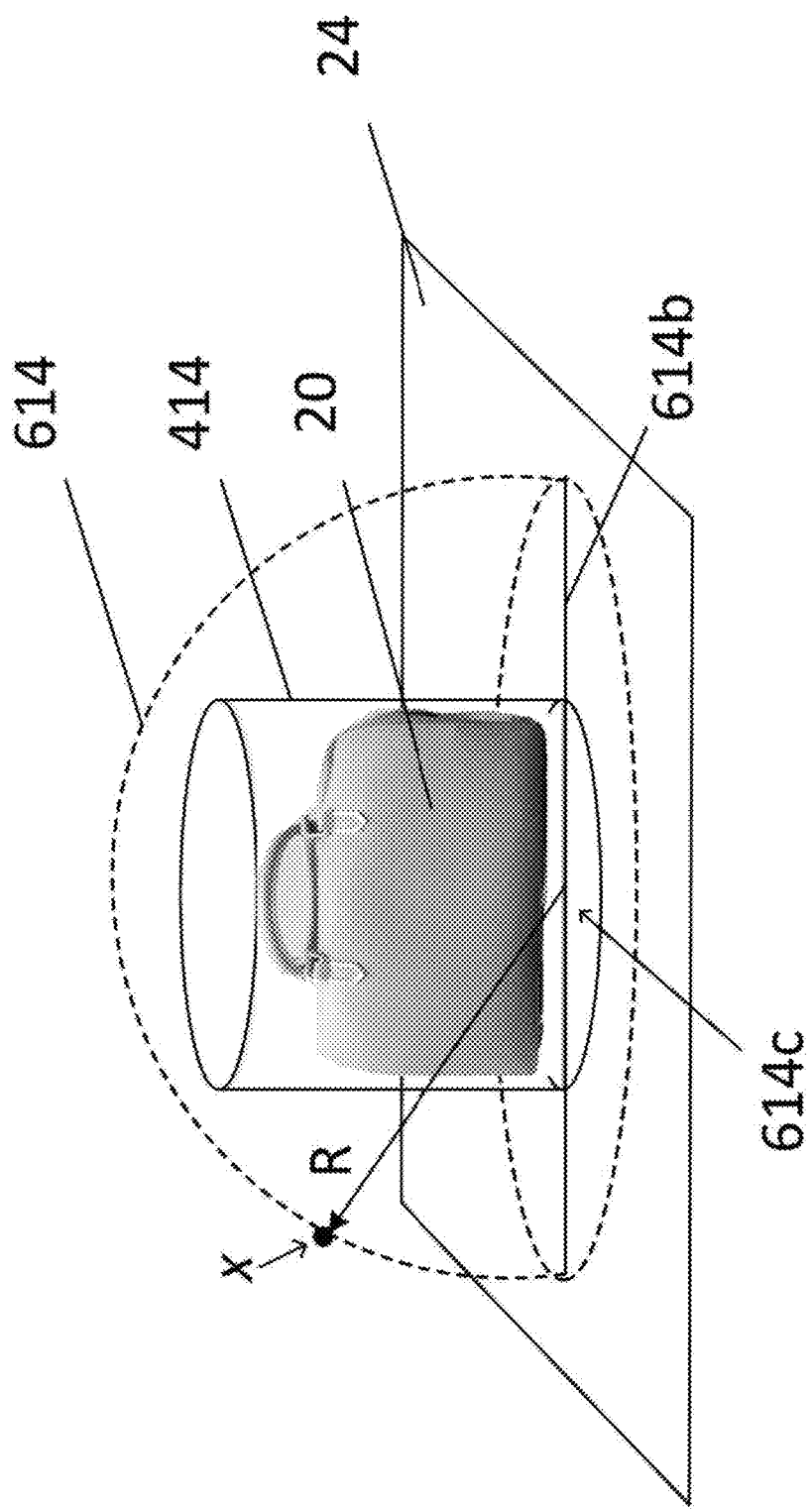
FIG. 6A illustrates one embodiment of an envelope around an object as an encompassing dome or hemisphere according to one embodiment of the present invention.
Figure 6B:
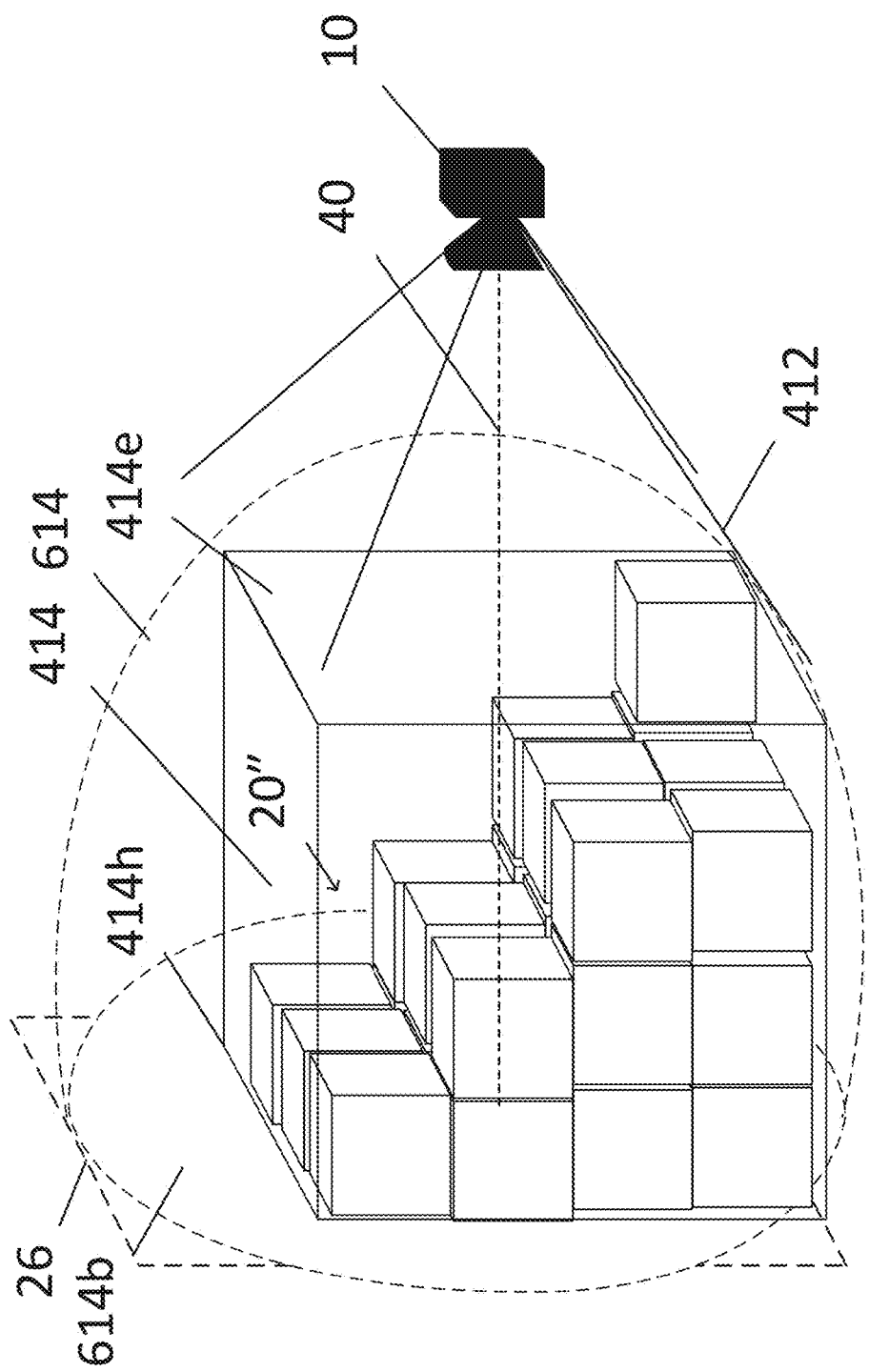
FIG. 6B illustrates one embodiment of an envelope around a portion of a scene as an encompassing dome or hemisphere according to one embodiment of the present invention.

According to one embodiment of the present invention, the reduced incremental coverage map is constructed in reference to an encompassing dome or hemisphere. FIG. 6A illustrates one embodiment of an envelope around an object as an encompassing dome or hemisphere according to one embodiment of the present invention. FIG. 6B illustrates one embodiment of an envelope around a portion of a scene as an encompassing dome or hemisphere according to one embodiment of the present invention.

In one embodiment of the present invention, as shown in FIG. 6A, when scanning an object on a ground plane, the encompassing dome 614 is defined by a hemisphere having a base 614b parallel to the ground plane 24, where the center of the base coincides with a point (e.g., the centroid) of the horizontal section of the cylindrical envelope 414 on the ground plane 24, called object ground center 614c. The radius R of the dome is set to a value large enough to fully contain the cylindrical envelope 414.

Similarly, in an embodiment of the present invention, as shown in FIG. 6B, when scanning a scene, the encompassing dome 614 is defined by a hemisphere having a base 614b parallel to the virtual background 26.

Figure 6C:
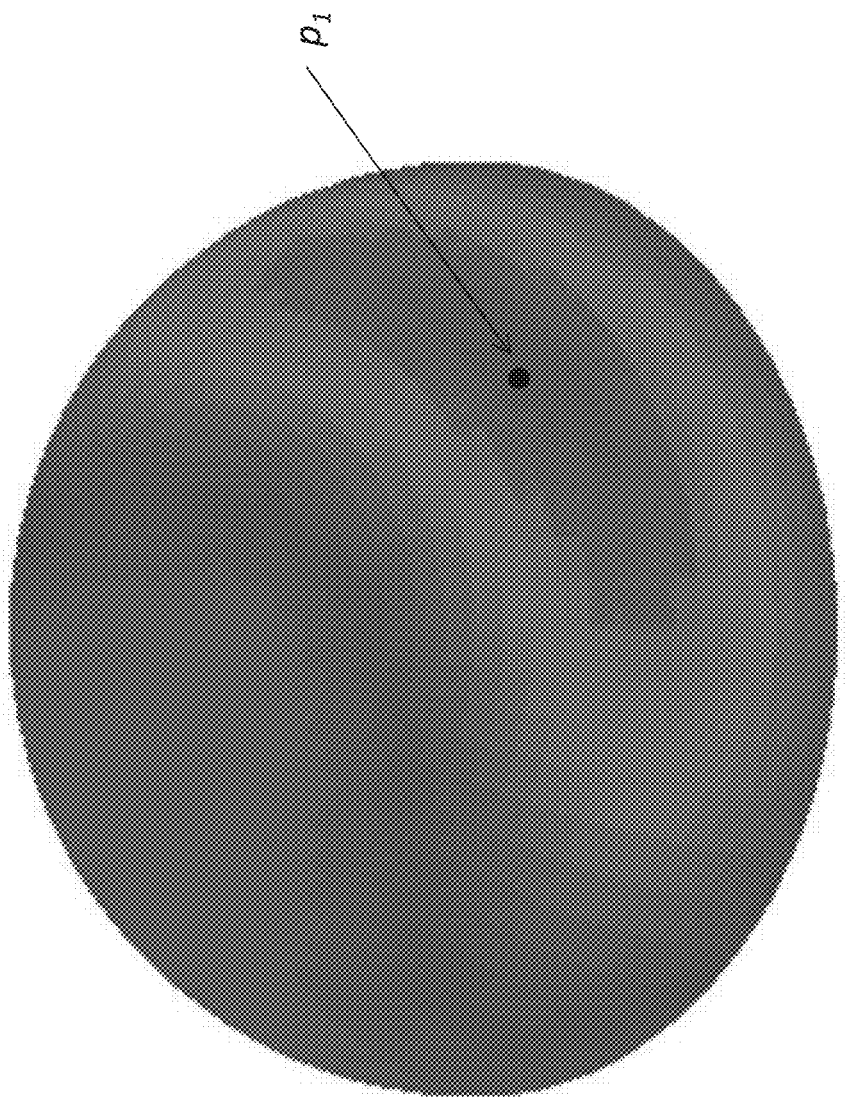
FIG. 6C is a visualization of a heat map represented on an encompassing dome according to one embodiment of the present invention.

Each point in the dome 614 represents a possible pose p=(x, O) of the depth camera of the scanning system 10. Specifically, x is any point on the dome 614 (and thus any point at distance R from the object's ground center), and O is the orientation of the depth camera such that the camera's optical axis intersects the object's ground center 614c. A tessellation is defined on the surface of dome, in a manner similar to that described above with respect to the tessellation of the surface of the cylindrical envelope 414. At each point during the scanning process, the incremental coverage map $\Delta\Omega^{N+1}$ is defined for this tessellation. In other words, each cell in the tessellation represents a specific pose p (e.g., a particular position x and orientation O of the depth camera), and is associated with the corresponding value $\Delta\Omega^{N+1}(p)$. In some embodiments, the incremental coverage map can be visualized as a heat map. FIG. 6C is a visualization of a heat map represented on an encompassing dome according to one embodiment of the present invention. (The shading may be used to indicate a portion of the dome to be imaged next in order to improve the current model, as described in more detail below.) Because the incremental coverage map is updated as additional images (e.g., depth images) are captured of the subject (e.g., an object or scene) from additional poses, the heat map on the dome is re-computed each time a new depth image is taken.

A point on the surface of the dome can be specified using only two parameters. This means that computing a heat map in the reduced incremental coverage map is a much simpler operation than computing a full incremental coverage map with six degrees of freedom.

In operation 308, the processor determines if the global coverage is sufficiently high and/or that the incremental coverage provided by any remaining pose is too low (e.g., satisfies a threshold value). This may be computed based on the full incremental coverage map or the reduced incremental coverage map. If so, then scanning is stopped and the model is finalized in operation 310, such as by rendering the final, high quality 3D model from the captured images. The process may also be manually stopped by a user. As noted above, in some embodiments, the process of finalizing the model in operation 310 includes transmitting some partially processed or raw data to a remote processor to generate the finalized 3D model. In some embodiments, building the 3D model is an intermediate stage in the process of performing an application-specific function (such as counting boxes or estimating unoccupied volume, as described in more detail below). Therefore, in some embodiments, operation 310 further includes computing the result of the application-specific function (such as computing the total count of boxes or computing the actual unoccupied volume of a space).

On the other hand, if the analysis shows that the 3D scan would benefit from additional images captured from different poses, then the process continues with operation 312.

In operation 312, the processor determines one or more poses that would improve coverage, and in operation 314, a next image is captured from a new pose, as guided by the one or more poses determined in operation 312. In operation 316, the guidance map is updated based on the additional images.

For example, in one embodiment, in operation 312 the processor determines a particular pose has the highest incremental coverage, as indicated by the incremental coverage map, and guide the scanning sensor to move the depth camera to that pose $p_1$ and to capture an image from that pose in operation 314. (This is shown, as an example, as the pose $p_1$ of FIG. 6C.) This would result in a "greedy" scanning strategy that allows reaching a desired level of global coverage in a short time. (Note that "moving the camera to pose p=(x, O)" means to move the camera to the location x and orienting by orientation O.) For user-friendliness, the particular pose $p_1$ may be approximate so that the depth camera is merely "close enough" to the location x (e.g., within a few centimeters) and have an orientation that is close enough to orientation O (e.g., within a few degrees) to provide the additional incremental coverage.

However, other embodiments of the present invention may implement different scanning strategies. For example, given an incremental coverage map, the processor can automatically determine a path that includes one or more poses that reduces or minimizes a cost function in operation 312. Images would be acquired as the depth camera moves along the path in operation 314 (e.g., automatically captured as the depth camera moves). This cost function could be defined in terms of shape information acquired (e.g., coverage) and of the time it would take to acquire this information following this path. The same coverage can be obtained by following different scanning paths, and that different paths could require different execution time, for example, due to the length of the path or whether the path crosses over regions that are already scanned, thereby resulting in oversampling. For example, the cost function for a given path could be the time that it takes to complete a scanning that results in coverage above a minimum threshold. The optimal scanning path (e.g., the path that minimizes the cost function) could be computed using path planning algorithms, and could be displayed to the user via an appropriate interface, or supplied to control the path of the depth camera directly through control of a robotically controlled depth camera mount.

In embodiments of the present invention where feedback is provided to a user, the heat map on a dome may be represented in using a proper graphical interface on the screen of the scanning system in operation 312. This screen may be part of a hand-held device (for example, within the same enclosure that contains the depth camera, such as in the embodiments of FIG. 2A or in a detachable form, as shown in FIG. 2B), or external or detachable (a laptop or desktop computer connected with the scanner, such as in the embodiments of FIG. 2B). The heat map could be represented, for example, using different colors on the surface of a rendered hemisphere (e.g., a location on the dome may be colored in red if it is associated with a high incremental coverage value, as shown in FIG. 6C). The location of the camera could be indicated on this hemisphere using, for example, a clearly identifiable marker (e.g., a dark dot or a camera shape). The colored heat map on the hemisphere is one embodiment of a user interface for directing the user to move the camera towards poses associated with high incremental coverage and capture images from those poses in operation 314, because poses with high incremental coverage have a high likelihood to cover previously uncovered patches of the surface of the object or of the scene.

Some embodiments of the present invention are directed to updating the heat map in accordance with changes in the position of the depth camera. A heat map on a dome with radius R can only provide information to the user about incremental coverage for poses on the dome with the same radius R. In other words, the heat map of FIG. 6C for a dome of radius R is only effective under the assumption that the user maintains the depth camera at substantially the same distance R from the object's ground center 614c, oriented so that the depth camera faces the object's ground center 614c. As such, the selection of the radius R at which the dome is computed can have an impact on the quality of the scan. A simple solution is to choose the dome's radius R to be equal to the current distance between the camera and the object's ground center. If the camera is moved closer to or father from the object's ground center, the dome's radius is changed accordingly, and the processor computes a new heat map for the new dome. Note that the user has freedom as to where to move the camera next, and how to orient it: each time a new depth image is collected the incremental coverage map is updated, and a new heat map is generated. For example, if the user moves the camera to a new location with distance R'≠R, the heat map is re-generated for a dome with radius of R'. Other options are possible; for example, the dome could be kept always at a fixed radius $R_O$.

In one embodiment of the present invention, when capturing an image in operation 314, the processor determines the pose (e.g., the location and orientation) of the camera with respect to the subject (e.g., the object or scene) at each picture. This could be obtained from registration of the 3D point clouds measured from different viewpoints using various methods well known in prior art, such as the Iterative Closest Point (ICP) algorithm. These methods for camera pose estimation may also make use of an inertial measurement unit (IMU), including accelerometers and gyros, attached to the camera. Miniaturized inertial sensors of the type embedded in modern smartphones are inexpensive and readily available. As such, embodiments of the present invention can determine the actual pose p of the depth camera during the capture of the image in operation 314.

In operation 316, the processor updates the guidance map based on the additional acquired images. In some embodiments, the processor also updates the shape of the envelope, including its size and position.

In operation 318, the processor updates the coverage map on the object envelope, which represents the current approximate knowledge of the object's shape. In some embodiments, the shape of the envelope is also updated, for example, by growing the size or changing the shape of the envelope to encompass portions of the subject (e.g., the object or scene) that were previously not encompassed by the envelope using the depth data registered against the current object model. This can provide a more accurate estimation of the surface coverage, at the cost of using a more complex model for the envelope and more computation of the surface coverage and incremental coverage.

After updating the coverage map, the flow returns to operation 306, where the updated coverage map is evaluated and, in operation 308, the processor determines whether to continue scanning based on the updated coverage map.

Example Use Cases

As used herein, the terms "accuracy" and the "completeness" of coverage of the scan can depend on the intended application of the 3D scan. For example, in applications directed to estimating the volume of available space or the counting number of boxes in a stack, the scanning system may be able to perform these computations using only a few images of key portions of the scene, and therefore the guidance provided by the system will select a few poses accordingly (e.g., poses that provide high incremental coverage of key locations or a search path for quickly locating key locations). As another example, in applications directed to scanning an object for producing a detailed 3D model (e.g., scanning an ornamental object for listing on a product page), a high level of detail and complete coverage may be desired and therefore, the guidance provided by the scanning system may identify a large number of poses in order to provide a high level of coverage of the object.

Item Counting, Boxes and Specific Things

Some aspects of embodiments of the present invention are directed to methods for applying a scanning system in logistics operations that would benefit from assisted or guided scanning. In one application, a large stack of packed boxes on a pallet or on warehouse shelves are scanned in order to obtain a 3D representation of the pallet or shelves and used to estimate the configuration of the packed boxes, which can then be used for obtaining an accurate count of the number of boxes in the stack and therefore estimate information such as current inventory, missing boxes, misplaced boxes, and the like.

For example, in one embodiment, a warehouse employee may walk up to a shelf and use a scanning system to perform a quick scan of the shelf, which contains an assortment of boxes. The result of the scan is automatically analyzed to quickly see the current inventory or box count and to determine information about missing boxes or misplaced items (e.g., discrepancies between information about the shelf in an inventory database and the result of the scan). A typical warehouse employee may perform several hundred to several thousand such scans every day, and therefore embodiments of the present invention using guided or assisted scanning provide a scanning system that is fast, responsive, reliable, and easy to use for warehouse employees who may receive limited training on the scanning system. The guidance provided by the scanning system helps to provide an accurate reconstruction of the pile of boxes and also maximal coverage in order to be able to efficiently process this data and to obtain accurate inventory information.

Figure 7A:
FIG. 7A depicts a user interface during a scanning process according to one embodiment of the present invention, in which portions having high scan quality are indicated with an overlay.
Figure 7A:
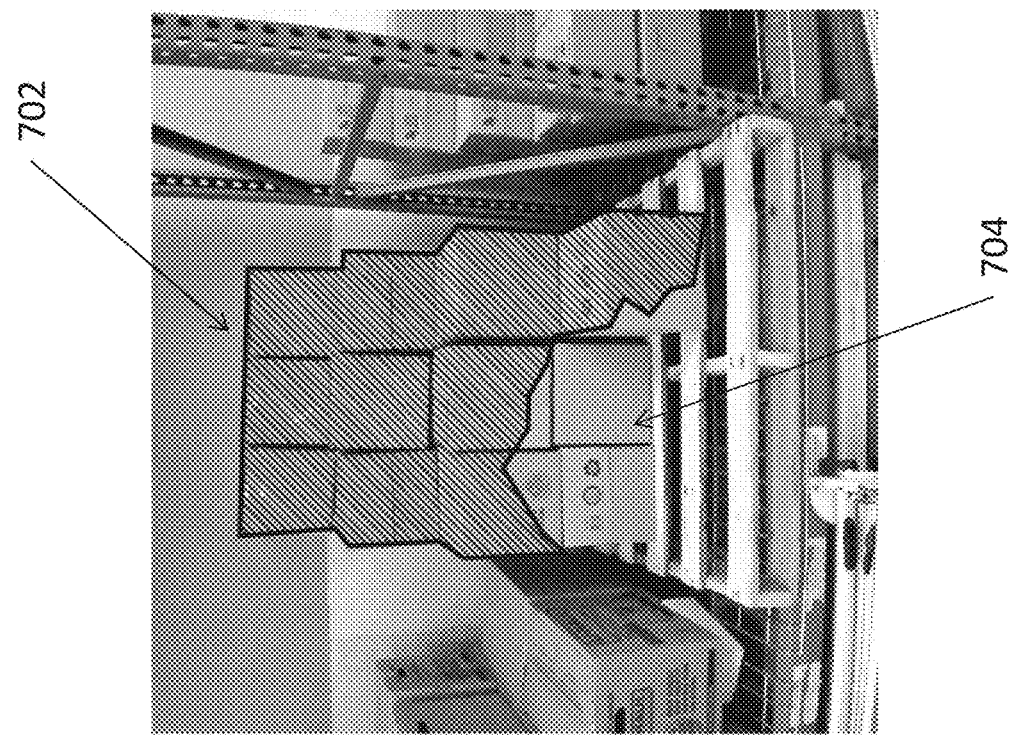

FIG. 7A depicts a user interface during a scanning process according to one embodiment of the present invention, in which portions having high scan quality are indicated with an overlay 702. In one embodiment, the left side of FIG. 7A represents a live view of a scene being scanned. Portions of the scene having good coverage are indicated with a diagonal-line overlay, whereas portions of the scene with poor coverage (e.g., high incremental coverage) have no overlay. As seen the bottom-left side of the stack of boxes 704 does not have good coverage (e.g., has high incremental coverage or low coverage), when compared to the boxes above and to the right, thereby providing guidance to the user that the depth camera should be moved to image the bottom-left portion of the stack to significantly increase the incremental coverage of the scan. The bottom-left portion of the stack in one key portion of the scene at least because the number of boxes on the pallet depends on the number of boxes on the left side of the stack. Other key portions of the scene include the other portions of the scene that include boxes. The right side of FIG. 7B is a zoomed-in view of the portion of the lower left portion 704 of the stack of boxes after one or more additional images has been captured, thereby providing coverage of the bottom-left portion of the stack of boxes.

Figure 7B:
FIG. 7B depicts a user interface after a scanning process according to one embodiment of the present invention for counting the number of boxes on a pallet.

FIG. 7B depicts a user interface after a scanning process according to one embodiment of the present invention for counting the number of boxes on a pallet. After capturing the 3D scan of the boxes, as shown in FIG. 7A, resulting 3D model can be analyzed to count the number of boxes that are present. By making assumptions about the occluded portions of the scene, namely, that all of the boxes on the pallet are substantially the same size and that the occluded boxes are stacked in the same manner as the other boxes, the scanning system automatically calculates that there are 28 boxes on the pallet. The shading of the various portions of the upper right portion of the user interface indicates the distance or depth of the corresponding portion of the scan, and the numbers indicate the number of boxes that are in that portion of the scan. The left side of the user interface shows the final count of the number of boxes, along with shading to indicate the depth of the various portions of the scene. The bottom right portion of the user interface displays a picture (e.g., a color photo) of the stack from one pose.

Volume Estimation

According to another embodiment of the present invention directed to logistics, the scanning system 10 may be used to estimate the volume of a collection of delivery packages to compare this estimated volume to the volume of the truck commissioned to carry this consignment. This information is very useful for logistics companies to maximize the usage of their trucks' carrying capacity and therefore keep costs down. Because the total volume of such a consignment is generally quite large, comparable to the size of the truck itself, it may be very difficult for a user to scan this consignment and to be successful in obtaining an accurate scan without ample guidance from the scanning system.

In addition, in some embodiments of the present invention, the scanning system may be used to estimate the available or unoccupied volume of the interior of a truck hold or of a shipping container, thereby allowing users to determine how much of the remaining consignment can be loaded onto the truck or into the container.

Figure 8A:
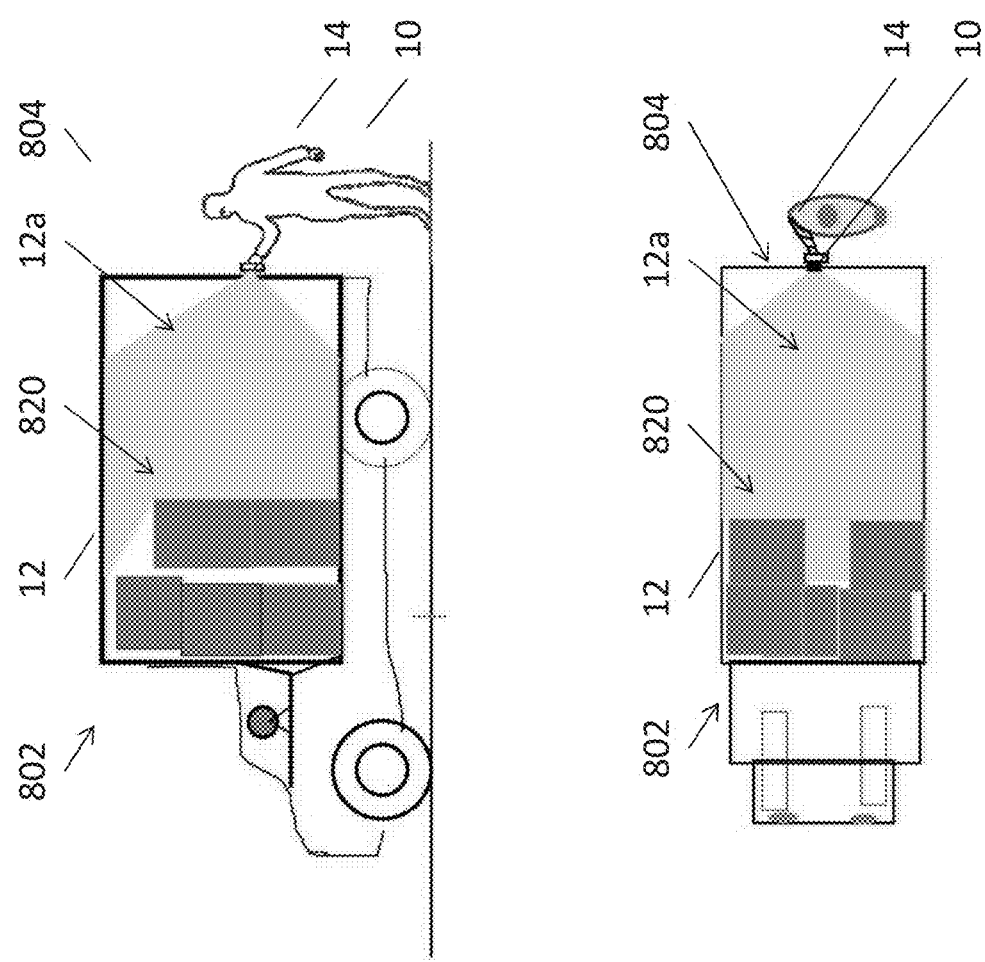
FIG. 8A is a schematic illustration of the scanning of the interior of a truck hold according to one embodiment of the present invention.

FIG. 8A is a schematic illustration of the scanning of the interior of a truck hold according to one embodiment of the present invention. As shown in FIG. 8A, a truck 802 may have a hold 12 that is partially filled with boxes 820. A user 14 can scan the interior of the hold with a scanning device to determine the available volume 12a.

Figure 8B:
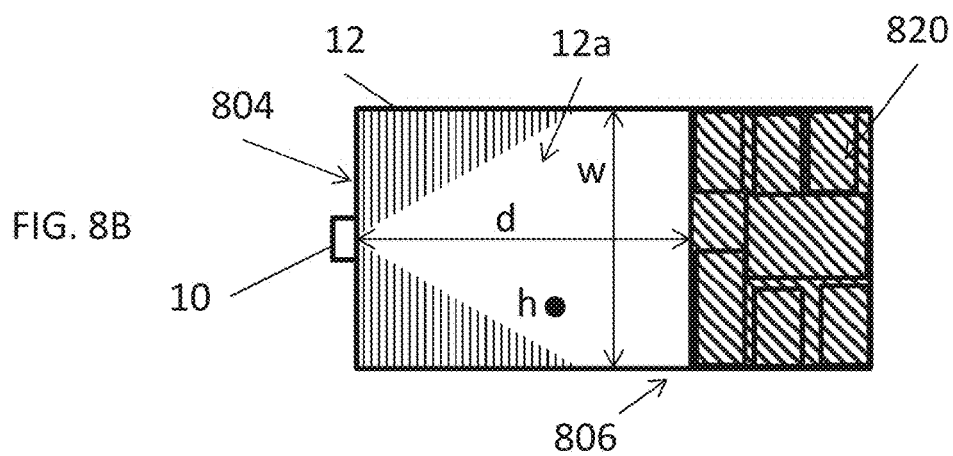
FIGS. 8B, 8C, and 8D are schematic illustrations of the computing the available volume within a truck according to one embodiment of the present invention.
Figure 8C:
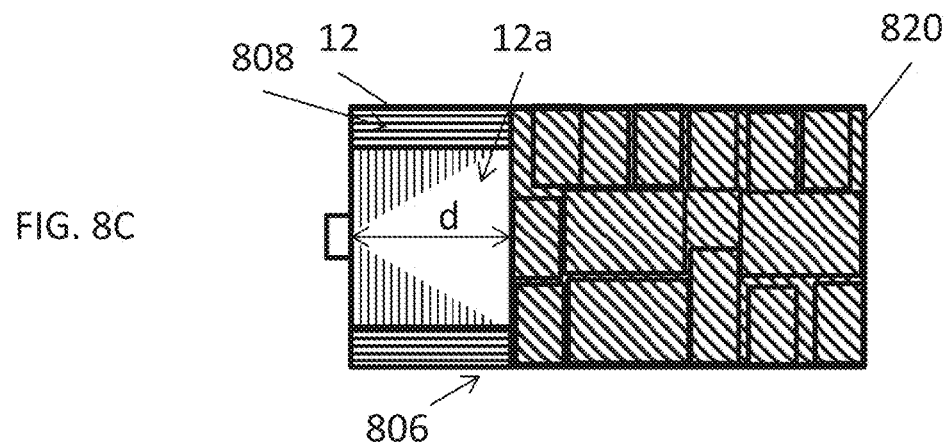
Figure 8D:
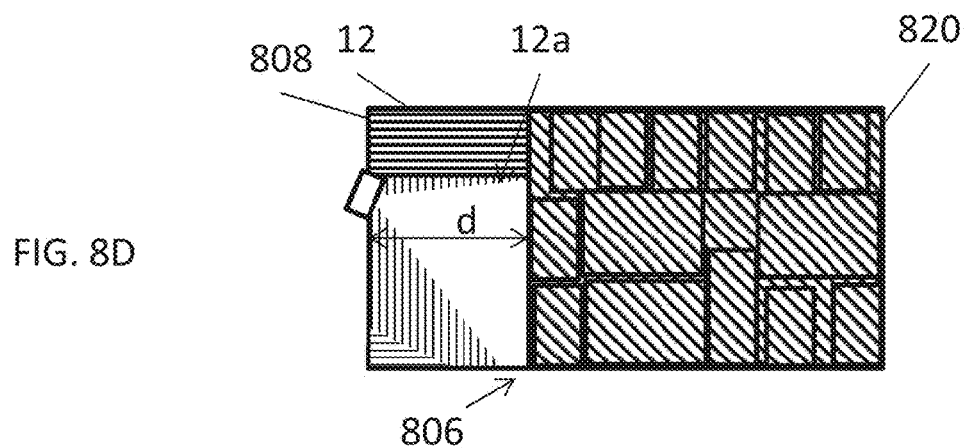

FIGS. 8B, 8C, and 8D are schematic illustrations of the computing the available volume within a truck according to one embodiment of the present invention. As shown in FIG. 8B, by scanning the interior of the hold from the opening at 804, it may be relatively simple to calculate the available volume of the truck based on the distance (d) to the boxes 820, and the width (w) and height (h) of the interior of the truck based on the distances to the various corners of the available space. As such, the corners may be thought of as key portions of the scene and the scanning system 10 may provide guidance to identify the locations of the corners (e.g., choose widely spaced poses until the corners of the available volume are found).

However, as shown in FIG. 8C, as the distance (d) becomes smaller, the corners 806 formed by the boxes with the side walls of the hold 12 may not be within the field of view of the camera (as shown in white). As a result, the volume 808 (labeled with horizontal shading) between the sidewalls and the edge of the field of view of the depth camera is not captured from a single pose.

As shown in FIG. 8D, by moving the depth camera to a new pose, the corners 806 can be imaged (e.g., captured within the field of view of the depth camera), thereby allowing estimation of the width (w) of the container, and thereby allowing for an accurate scan of the interior. FIG. 8D merely shows the capture of one of the corners 806, and capturing the other corner would further involve moving the depth camera to another pose.

As with the above use case of scanning pallets of boxes, having a scanning system that assists and guides the user by providing a specific trajectory to follow to improve or maximize coverage and quality of scan while reducing or minimizing the total time taken to scan can improving efficiency and accuracy of the scanning process.

Object Scanning

Figure 9A:
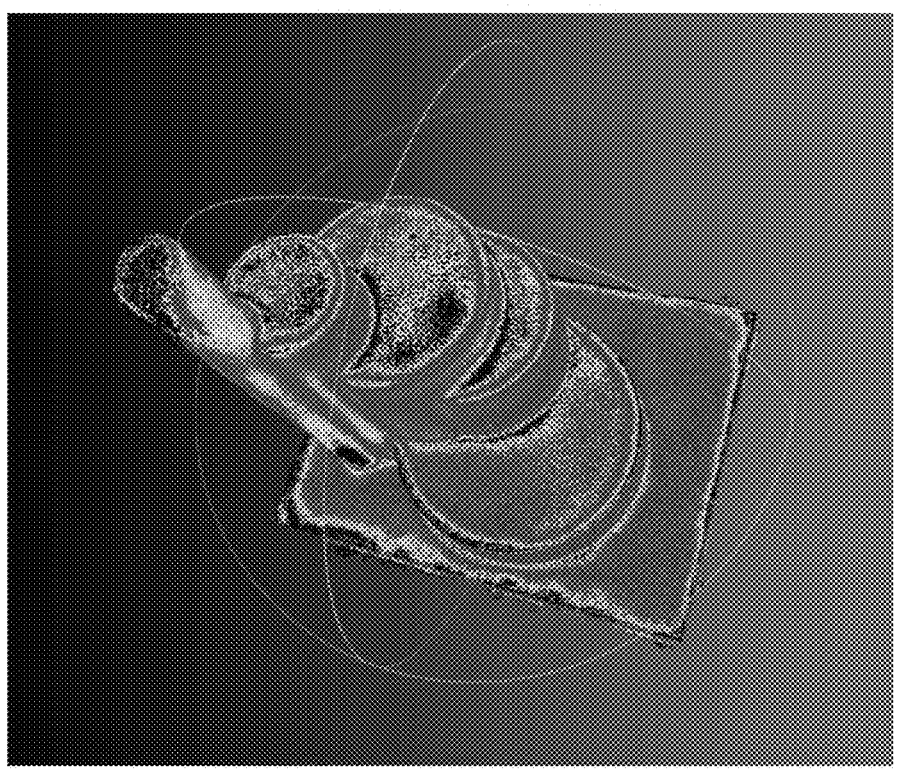
FIG. 9A is a color coded diagram illustrating regions of scan error when performing a scan of an object without the benefit of an assisted scanning system according to embodiments of the present invention.
Figure 9B:
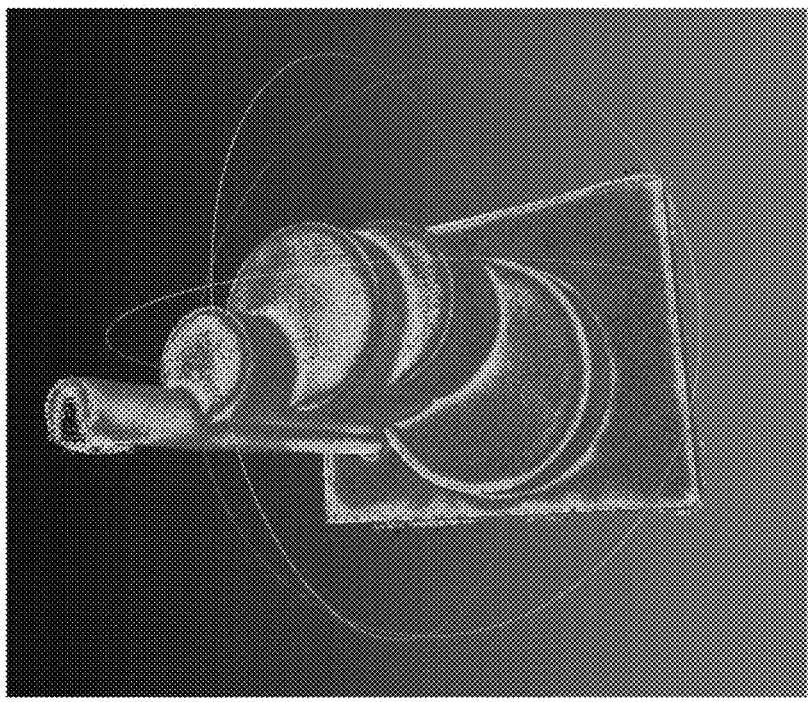
FIG. 9B is a color coded diagram illustrating regions of scan error when performing a scan of an object using an assisted scanning system according to embodiments of the present invention.

FIG. 9A is a color coded diagram illustrating regions of scan error when performing a scan of an object without the benefit of an assisted scanning system according to embodiments of the present invention. FIG. 9B is a color coded diagram illustrating regions of scan error when performing a scan of an object using an assisted scanning system according to embodiments of the present invention. When scanning a complex object to generate a 3D model (e.g., for display), it may be more important to generate a detailed model of all parts of the object.

As shown in FIGS. 9A and 9B, the accuracy of the scan is significantly improved when the user is provided with guidance according to embodiments of the present invention.

Static Pose Generation

In embodiments of the present invention directed to identifying a plurality of poses for a plurality of cameras that are statically arranged to image a portion of a scene, as described above with respect to FIG. 1C, the incremental coverage map may be used to identify the plurality of poses for some number k of cameras. For example, each pose may be selected by choosing a pose p of the incremental coverage map having the highest incremental coverage. The incremental coverage map may then be updated based on this pose, and a next pose is selected. The process continues until the number k poses have been identified. In other embodiments, the number of cameras is not fixed and the process continues until a sufficient number of poses to cover the object are identified.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional scanning system comprises:
   a depth camera configured to capture images, wherein the images comprise depth images;
   a processor; and
   memory coupled to the depth camera and the processor, the memory being configured to store:
   the depth images captured by the depth camera; and
   instructions that, when executed by the processor, cause the processor to:
      control the depth camera to capture one or more initial depth images of a subject from a first pose of the depth camera;
      compute a guidance map in accordance with the one or more initial depth images to identify one or more next poses, the guidance map being computed by:
         defining, based on the one or more initial depth images of the subject, an envelope surrounding the subject, the envelope comprising a plurality of patches, each patch corresponding to at least one potential pose of a plurality of potential poses, the plurality of potential poses comprising the one or more next poses; and
         computing a plurality of incremental coverage values, each of the incremental coverage values corresponding to one of the plurality of patches and each of the incremental coverage values representing an amount of improvement in a global coverage of the subject provided by capturing an additional depth image with the depth camera at the at least one potential pose of the corresponding one of the patches;
      control the depth camera to capture one or more additional depth images from at least one of the one or more next poses;
      update the guidance map in accordance with the one or more additional depth images; and
      output the depth images captured by the depth camera to generate a three-dimensional model.

2. The three-dimensional scanning system of claim 1, wherein the depth camera is a stereoscopic depth camera comprising:
   a first camera having a first field of view with a first optical axis; and
   a second camera spaced apart from the first camera and having a second field of view overlapping the first field of view and having a second optical axis substantially parallel to the first optical axis.

3. The three-dimensional scanning system of claim 1, further comprising a color camera registered with the depth camera.

4. The three-dimensional scanning system of claim 1, further comprising a display coupled to the processor,
   wherein the memory further stores instructions that cause the processor to control the display to provide visual feedback to a user of the three-dimensional scanning system, the visual feedback comprising a graphical representation of the incremental coverage values of the one or more next poses of the guidance map.

5. The three-dimensional scanning system of claim 4, wherein the graphical representation is a dome around the subject, and a heat map indicates which portions of the dome correspond to the one or more next poses, the values of the heat map corresponding to the values of the incremental coverage values.

6. The three-dimensional scanning system of claim 1, wherein the one or more next poses form a path.

7. The three-dimensional scanning system of claim 6, wherein the path is selected in accordance with increasing coverage of the subject and reducing scanning time.

8. The three-dimensional scanning system of claim 1, wherein the guidance map is a coverage map.

9. The three-dimensional scanning system of claim 1, wherein the subject is a container,
   wherein the memory further stores instructions that cause the processor to estimate an available volume of the container based on the three-dimensional model, and
   wherein the guidance map identifies the one or more next poses to locate corners of the available volume.

10. The three-dimensional scanning system of claim 1, wherein the subject is a stack of boxes,
    wherein the memory further stores instructions that cause the processor to count the number of boxes based on the three-dimensional model, and
    wherein the guidance map identifies the one or more next poses to identify boxes having low coverage.

11. A method for providing guided scanning, the method comprising:
    controlling, by a processor, a depth camera to capture one or more initial depth images of a subject from a first pose of the depth camera;
    computing, by the processor, a guidance map in accordance with the one or more initial depth images to identify one or more next poses, the guidance map being computed by:
       defining, based on the one or more initial depth images of the subject, an envelope surrounding the subject, the envelope comprising a plurality of patches, each patch corresponding to at least one potential pose of a plurality of potential poses, the plurality of potential poses comprising the one or more next poses; and computing a plurality of incremental coverage values, each of the incremental coverage values corresponding to one of the plurality of patches and each of the incremental coverage values representing an amount of improvement in a global coverage of the subject provided by capturing an additional depth image with the depth camera at the at least one potential pose of the corresponding one of the patches;

controlling, by the processor, the depth camera to capture one or more additional depth images from at least one of the one or more next poses;

updating, by the processor, the guidance map in accordance with the one or more additional depth images; and outputting the depth images captured by the depth camera to generate a three-dimensional model.

12. The method of claim 11, wherein the depth camera is a stereoscopic depth camera comprising:
 a first camera having a first field of view with a first optical axis; and
 a second camera spaced apart from the first camera and having a second field of view overlapping the first field of view and having a second optical axis substantially parallel to the first optical axis.

13. The method of claim 11, further comprising providing visual feedback to a user through a display coupled to the processor, the visual feedback comprising a graphical representation of the incremental coverage values of the one or more next poses of the guidance map.

14. The method of claim 13, wherein the graphical representation is a dome around the subject, and a heat map indicates which portions of the dome correspond to the one or more next poses, the values of the heat map corresponding to the values of the incremental coverage values.

15. The method of claim 11, wherein the one or more next poses form a path.

16. The method of claim 15, wherein the path is selected in accordance with increasing coverage of the subject and reducing scanning time.

17. The method of claim 11, wherein the subject is a container,
 wherein the method further comprises estimating an available volume of the container based on the three-dimensional model, and
 wherein the guidance map identifies the one or more next poses to locate corners of the available volume.

18. The method of claim 11, wherein the subject is a stack of boxes,
 wherein the method further comprises counting the number of boxes based on the three-dimensional model, and
 wherein the guidance map identifies the one or more next poses to identify boxes having low coverage.

19. A three-dimensional scanning system comprises:
 a camera configured to capture images;
 a processor; and
 memory coupled to the camera and the processor, the memory being configured to store:
 the images captured by the camera; and
 instructions that, when executed by the processor, cause the processor to:
  control the camera to capture one or more initial images of a subject from a first pose of the camera;
  compute a guidance map in accordance with the one or more initial images to identify one or more next poses, the guidance map being computed by:
   defining, based on the one or more initial images of the subject, an envelope surrounding the subject, the envelope comprising a plurality of patches, each patch corresponding to at least one potential pose of a plurality of potential poses, the plurality of potential poses comprising the one or more next poses; and
   computing a plurality of incremental coverage values, each of the incremental coverage values corresponding to one of the plurality of patches and each of the incremental coverage values representing an amount of improvement in a global coverage of the subject provided by capturing an additional image with the camera at the at least one potential pose of the corresponding one of the patches;
  control the camera to capture one or more additional images from at least one of the one or more next poses;
  update the guidance map in accordance with the one or more additional images; and
  output the images captured by the camera to generate a three-dimensional model.

* * * * *